United States Patent
Sugino

(10) Patent No.: US 10,753,344 B2
(45) Date of Patent: Aug. 25, 2020

(54) PRIME MOVER

(71) Applicant: Kouichi Sugino, Kanazawa (JP)

(72) Inventor: Kouichi Sugino, Kanazawa (JP)

( * ) Notice: Subject to any disclaimer, the term of this patent is extended or adjusted under 35 U.S.C. 154(b) by 0 days.

(21) Appl. No.: 16/348,990

(22) PCT Filed: Nov. 6, 2017

(86) PCT No.: PCT/JP2017/039957
§ 371 (c)(1),
(2) Date: May 10, 2019

(87) PCT Pub. No.: WO2018/088365
PCT Pub. Date: May 17, 2018

(65) Prior Publication Data
US 2019/0277265 A1 Sep. 12, 2019

(30) Foreign Application Priority Data

Nov. 11, 2016 (JP) ................................. 2016-220163
Mar. 21, 2017 (JP) ................................. 2017-054156

(51) Int. Cl.
*F03G 3/00* (2006.01)

(52) U.S. Cl.
CPC ..................................... *F03G 3/00* (2013.01)

(58) Field of Classification Search
CPC ..................................... F03G 3/00; F03G 7/10
See application file for complete search history.

(56) References Cited

U.S. PATENT DOCUMENTS

| | | | | |
|---|---|---|---|---|
| 2013/0270836 | A1* | 10/2013 | Quraishy | F03G 3/08 290/1 A |
| 2015/0130192 | A1* | 5/2015 | Palani | F03G 7/10 290/1 A |
| 2015/0345477 | A1* | 12/2015 | Lauch | F03G 7/10 74/84 R |
| 2016/0195071 | A1* | 7/2016 | Pellegrin | F03G 3/06 185/27 |

FOREIGN PATENT DOCUMENTS

| | | |
|---|---|---|
| JP | 2007056854 A | 3/2007 |
| JP | 2010185446 A | 8/2010 |
| JP | 2012030765 A | 2/2012 |

* cited by examiner

*Primary Examiner* — Phillip A Johnson
(74) *Attorney, Agent, or Firm* — King & Schickli, PLLC

(57) ABSTRACT

The invention provides a prime mover that is able to efficiently convert the potential energy of a weight to kinetic energy of an output shaft, and that is able to cause the output shaft to rotate over a long period of time. For the purpose, a prime mover 1 has at least three disks, including a first disk 3, a second disk 4, and a constant-torque disk 5 that are affixed concentrically to an output shaft 2; a first cord 6 wound on an outer circumferential surface 31 or 41 respectively of the first disk 3 or the second disk 4; and a first weight 7 and a second weight 8 respectively attached to ends of this first cord 6. The radius of the first disk 3 is longer than the radius of the second disk 4, constant torque is generated by the constant-torque disk 5, and the first cord 6 is able to move between being wound on the outer circumferential surface 31 of the first disk 3 or the outer circumferential surface 41 of the second disk 4.

20 Claims, 13 Drawing Sheets

PRIME MOVER

TECHNICAL FIELD

The present invention relates to a prime mover, In particular, the present invention relates to a prime mover having a shaft for rotating the prime mover, wherein the shaft is enabled to rotate repeatedly in the forward direction and then in the reverse direction for a long period of time.

BACKGROUND OF THE INVENTION

Conventionally, there has been known a prime mover which is designed to generate a moving power by converting the potential energy of a weight to the kinetic energy of a output shaft.

Patent Document 1 shows one example of such a prime mover. The prime mover shown in Document 1 is designed such that an output shaft employed as a rotatable axis is enabled to rotate by taking advantage of the force to be generated as the weight falls, that the weight thus fell down is then pulled up to an uppermost portion by taking advantage of a spring and a pulley, and that the weight thus pulled up is then caused to fall, thereby enabling the output shaft to continuously rotate.

PRIOR ART

Patent Document 1: JP Patent Application Publication: No. 2010-185446.

BRIEF SUMMARY OF THE INVENTION

Problems to be Solved by the Invention

According to the prime mover shown in Document 1, it is required to wind up the weight which has been once fallen down. Therefore, it is required to consume energy in order to wind up the weight. In the case of the prime mover as shown in Document 1, the energy to be actually obtained therefrom would be such a value that can be obtained by subtracting the winding-up energy from the kinetic energy of the output shaft that has been converted from the potential energy of a weight. Therefore, there is a problem of limitation in improving the energy-converting efficiency, i.e. a value to be obtained by dividing an actually obtainable energy by the potential energy of the weight.

In view of the above problem, the purpose of the present invention is to provide a prime mover which is not only capable of efficiently converting the potential energy of weight into a kinetic energy of output shaft but also capable of rotating the output shaft for a long period of time.

Means for Solving the Problems

In order to solve the aforementioned problem, the prime mover according Claim 1 is constructed such that it comprises:

at least three disks, i.e. a first disk, a second disk and a constant torque disk, each of which is concentrically fixed to an output shaft, the axis of which being mounted in perpendicular to the direction of gravity;

a first cord wrapped around the outer peripheral surface of either the first disk or the second disk;

a first weight and a second weight which are attached respectively to both ends of the first cord; wherein the radius of the first disk is made longer than the radius of the second disk; the constant torque disk is designed to generate a constant torque;

the first cord is enabled to transition between a state where it is wrapped around the outer peripheral surface of the first disk and a state where it is wrapped around the outer peripheral surface of the second disk;

the first weight is hung down on one side of the output shaft so as to generate a torque in the output shaft in a direction opposite to the aforementioned constant torque, the second weight is hung down on the opposite side of the output shaft so as to generate a torque in the output shaft in the same direction as that of the aforementioned constant torque;

the first weight is larger in mass than the second weight;

the constant torque is made smaller than the first torque to be generated in the first disk under a state where the first cord is wrapped around the outer peripheral surface of the first disk, as the constant torque is calculated based on a specific value to be obtained in such a way that a value to be obtained by subtracting the mass of the second weight from the mass of the first weight is multiplied by the gravitational acceleration and then the value thus obtained is further multiplied by the length of the radius of the first disk to obtain the specific value;

the second torque to be generated in the second disk is made smaller than the constant torque under a condition where the first cord is wrapped around the outer peripheral surface of the second disk as when the second torque is calculated based on a specific value to be obtained in such a way that a value to be obtained by subtracting the mass of the second weight from the mass of the first weight is multiplied by the gravitational acceleration and then the value thus obtained is further multiplied by the length of the radius of the second disk to obtain the specific value; and the first cord is enabled to transition at a prescribed interval between a state where it is wrapped around the outer peripheral surface of the first disk and a state where it is wrapped around the outer peripheral surface of the second disk, thereby making it possible to enable the output shaft to the rotate repeatedly in the forward direction and then in the reverse direction.

In the case of the prime mover according to one embodiment, when it is disposed in a state where the first cord is wound around the outer peripheral surface of the first disk, the constant torque is made smaller than the first torque. In the case of the prime mover of claim 1 on the other hand, when it is disposed in a state where the first cord is wound around the outer peripheral surface of the second disk, the second torque is made smaller than the constant torque.

As a result, in a state where the first cord is wound around the outer peripheral surface of the first disk, the first weight attached to one end of the first cord is caused to move downward and, in conjunction with this movement of the first weight, the second weight attached to the opposite end of the first cord is caused to move upward.

In a state where the first cord is wound around the outer peripheral surface of the second disk, the first weight attached to one end of the first cord is caused to move upward and, in conjunction with this movement of the first weight, the second weight attached to the opposite end of the first cord is caused to move downward.

Due to the transition at a prescribed interval between a state where the first cord is wrapped around the outer peripheral surface of the first disk and a state where it is wrapped around the outer peripheral surface of the second disk, the output shaft of the prime mover of claim 1 is enabled to repeat the rotation in the forward direction and the rotation in the reverse direction.

In the case of the prime mover according to one embodiment, a second cord having a third weight and a fourth weight attached respectively to the both ends thereof is wound around the outer peripheral surface of the constant torque disk in the prime mover of claim 1. The third weight is made larger in mass than the fourth weight. As it is viewed from the shaft line, the fourth weight is hung down on one side of the output shaft and the third weight is hung down on the opposite side of the output shaft.

According to the prime mover according to one embodiment, the prime mover is not only enabled to act as in the case of the prime mover of claim 1 but also enabled to easily change a constant value of torque that can be generated in the constant torque disk.

In the case of the prime mover according to one embodiment is modified in such manner that the first disk and the second disk are disposed neighboring to face each other along the axial direction thereof; the prime mover is further provided with a guide passage connecting the outer peripheral surface of the first disk and the outer peripheral surface of the second disk; and the first cord designed to be guided by way of the guide passage to a state where the first cord is wound around the outer peripheral surface of the first disk from a state where the first cord is wound around the outer peripheral surface of the second disk in a process of ascending the first weight; and the first cord designed to be guided by way of the guide passage to a state where the first cord is wound around the outer peripheral surface of the second disk from a state where the first cord is wound around the outer peripheral surface of the first disk in a process of ascending the second weight.

According to the prime mover according to one embodiment, it is not only possible to act in the same manner as those of the prime movers, but also possible, by way of the guide passage, to transition between a state where the first cord is wound around the outer peripheral surface of the first disk and a state where the first cord is wound around the outer peripheral surface of the second disk while enabling the output shaft to rotate.

In the case of the prime mover according to one embodiment, the prime mover is modified in such manner that the first disk and the second disk are disposed neighboring to face each other along the axial direction thereof, that there is further provided with an inclined surface constituting a side surface configuration of truncated cone thereby connecting the outer peripheral surface of the first disk and the outer peripheral surface of the second disk, that the first cord can be guided along the inclined surface in a process of rising the first weight so as to create a state wherein the first cord is wound around the outer peripheral surface of the first disk from a state where the first cord is wound around the outer peripheral surface of the second disk, and that the first cord can be guided along the inclined surface in a process of rising the second weight so as to create a state wherein the first cord is wound around the outer peripheral surface of the second disk from a state where the first cord is wound around the outer peripheral surface of the first disk.

According to the prime mover according to one embodiment, it is not only possible to act in the same manner as those of the prime movers, but also possible to transition, along the inclined surface, between a state where the first cord is wound around the outer peripheral surface of the first disk and a state where the first cord is wound around the outer peripheral surface of the second disk while enabling the output shaft to rotate.

In the case of the prime mover according to one embodiment, the prime mover is modified in such manner that, in a process of moving the first weight upward, the first weight is guided or shifted to a position where one end of the first cord is caused to hang from the first disk from a position where one end of the first cord hangs down from the second disk and that, in a process of moving the second weight upward, the second weight is guided or shifted to a position where one end of the first cord is caused to hang from the second disk from a position where other end of the first cord hangs down from the first disk.

According to the prime mover according to one embodiment, it is not only possible to act in the same manner as those of any one of the prime movers, but also possible, due to the guiding or change in position of the first weight and the second weight, to transition between a state where the first cord is wound around the outer peripheral surface of the first disk and a state where the first cord is wound around the outer peripheral surface of the second disk.

In the case of the prime mover according to one embodiment, the prime mover is further provided with a position-adjusting means so that, after finishing the rotation of the output shaft in the forward direction and in the reverse direction, the third weight is moved upward or downward to the initial position of the third weight before the aforementioned rotation thereof in the forward direction and the fourth weight is caused to move upward or downward to the initial position of the fourth weight before the aforementioned rotation thereof in the forward direction.

According to the prime mover according to one embodiment, it is not only possible to act in the same manner as those of any one of the prime movers, but also possible, due to the provision of the position-adjusting means, to return the third weight to the initial position before the rotation in the forward direction even if the third weight is not returned to the initial position before the rotation in the forward direction. When the third weight is returned to the initial position before the rotation in the forward direction thereof, the fourth weight attached to the same cord can be also returned to the initial position thereof.

The prime mover according to one embodiment is constructed such that it comprises at least two disks, i.e. a variable radius disk and a constant torque disk, all of which are fixed concentrically to the output shaft, the axis of which being disposed perpendicular to the direction of gravity;

a cord wrapped around the outer peripheral surface of each of the variable radius disks; and a first weight and a second weight which are attached respectively to the end portions of the cord; wherein the radius of each of the variable radius disks is made variable;

the constant torque disk is designed to generate a constant torque;

the first weight is hung down on one side of the output shaft so as to generate a torque in the output shaft in a direction opposite to the aforementioned constant torque;

the second weight is hung down on the opposite side of the output shaft so as to generate a torque in the output shaft in the same direction as that of the aforementioned constant torque;

the first weight is larger in mass than the second weight;

the constant torque is made smaller than a first torque to be generated in the variable radius disk as it is calculated based on a specific value to be obtained through not only the multiplication of a value to be obtained through subtraction of the mass of the second weight from the mass of the first weight by the gravitational acceleration but also a further multiplication thereof by the longer radius of the variable radius disk under a condition where the radius of the variable radius disks is long, thereby obtaining the specific value;

a second torque to be generated in the variable radius disk is made smaller than the constant torque as it is calculated based on a specific value to be obtained through not only the multiplication of a value to be obtained through subtraction of the mass of the second weight from the mass of the first weight by the gravitational acceleration but also a further multiplication thereof by the shorter radius of the variable radius disk under the condition where the radius of the variable radius disk is short, thereby obtaining the specific value; and the output shaft is enabled to repeat the rotation of forward direction and the rotation of reverse direction due to the transition at a prescribed interval between a state where the radius of the variable radius disk is long and a state where the radius of the variable radius disk is short.

In the case of the prime mover according to one embodiment, in a state where the radius of the first disk is long, the constant torque is made smaller than that of the first torque. On the other hand, in the case of the prime mover according to one embodiment, in a state where the radius of the first disk is short, the second torque is made smaller than that of the constant torque.

As a result, in a state where the first disk is made long in radius, the first weight attached to one end of the cord is moved downward and, in conjunction with the movement of the first weight, the second weight attached to the other end of the cord is moved upward.

In a state where the first disk is made short in radius, the first weight attached to one end of the cord is moved upward and, in conjunction with the movement of the first weight, the second weight attached to the other end of the cord is moved downward.

Due to the transition at a prescribed interval between the state where the first disk is made long in radius and the first disk is made short in radius, the prime mover according to one embodiment is enabled to repeat the movement of the output shaft in forward direction and the movement of the output shaft in reverse direction for a long period of time.

The prime mover according to one embodiment is constructed such that it comprises at least four disks, i.e. a first disk, a second disk, third disk and a fourth disk, each of which is concentrically fixed to an output shaft, the axis of which being mounted in perpendicular to the direction of gravity;

a first cord wrapped around the outer peripheral surface of either the first disk or the second disk;

a first weight and a second weight which are attached respectively to the both ends of the first cord;

a second cord wrapped around the outer peripheral surface of either the third disk or the fourth disk;

a third weight and a fourth weight which are attached respectively to the both ends of the second cord; wherein the radius of the first disk is made longer than the radius of the second disk;

the first cord is enabled to transition between a state where it is wrapped around the outer peripheral surface of the first disk and a state where it is wrapped around the outer peripheral surface of the second disk;

the first weight is hung down on one side of the output shaft;

the second weight is hung down on the opposite side of the output shaft;

the first weight is larger in mass than the second weight;

the radius of the third disk is made longer than the radius of the fourth disk;

the second cord is enabled to transition between a state where it is wrapped around the outer peripheral surface of the third disk and state where it is wrapped around the outer peripheral surface of the fourth disk;

the third weight is hung down on the opposite side of the output shaft;

the fourth weight is hung down on one side of the output shaft;

the third weight is larger in mass than the fourth weight;

a first torque to be generated in the first disk as it is calculated based on a specific value to be obtained through not only the multiplication of a value to be obtained through subtraction of the mass of the second weight from the mass of the first weight by the gravitational acceleration but also a further multiplication thereof by the length of the radius of the first disk under a condition where the first cord is wrapped around the outer peripheral surface of the first disk and the second cord is wrapped around the outer peripheral surface of the third disk is made smaller than a third torque to be generated in the third disk as it is calculated based on the value to be obtained through not only the multiplication of a specific value to be obtained through subtraction of the mass of the fourth weight from the mass of the third weight by the gravitational acceleration but also a further multiplication thereof by the length of the radius of the third disk;

a second torque to be generated in the second disk as it is calculated based on a specific value to be obtained through not only the multiplication of a value to be obtained through subtraction of the mass of the second weight from the mass of the first weight by the gravitational acceleration but also a further multiplication thereof by the length of the radius of the second disk under a condition where the first cord is wrapped around the outer peripheral surface of the second disk and the second cord is wrapped around the outer peripheral surface of the fourth disk is made larger than a fourth torque to be generated in the fourth disk as it is calculated based on a specific value to be obtained through not only the multiplication of a value to be obtained through subtraction of the mass of the fourth weight from the mass of the third weight by the gravitational acceleration but also a further multiplication thereof by the length of the radius of the fourth disk, thereby obtaining the specific value; and a state where the first cord is wrapped around the outer peripheral surface of the first disk and the second cord is wrapped around the outer peripheral surface of the third disk and a state where the first cord is wrapped around the outer peripheral surface of the second disk and the second cord is wrapped around the outer peripheral surface of the fourth disk are repeatedly transitioned at a prescribed interval, thereby making it possible to enable the output shaft to the rotate repeatedly in the forward direction and then in the reverse direction.

In the case of the prime mover according to one embodiment, when it is disposed in a state where the first cord is wound around the outer peripheral surface of the first disk and the second cord is wound around the outer peripheral surface of the third disk, the first torque is made smaller than the third torque. In the case of the prime mover of claim 8 on the other hand, when it is disposed in a state where the first cord is wound around the outer peripheral surface of the second disk and the second cord is wound around the outer peripheral surface of the fourth disk, the second torque is made smaller than the fourth torque.

As a result, in a state where the first cord is wound around the outer peripheral surface of the first disk and the second cord is wound around the outer peripheral surface of the third disk, the first weight attached to one end of the first cord is caused to move upward and, in conjunction with this movement of the first weight, the second weight attached to the opposite end of the first cord is caused to move downward. Likewise, the third weight attached to one end of the second cord is caused to move downward and, in conjunction with this movement of the third weight, the fourth weight attached to the opposite end of the second cord is caused to move upward.

In a state where the first cord is wound around the outer peripheral surface of the second disk and the second cord is wound around the outer peripheral surface of the fourth disk, the first weight attached to one end of the first cord is caused to move downward and, in conjunction with this movement of the first weight, the second weight attached to the opposite end of the first cord is caused to move upward. Likewise, the third weight attached to one end of the second cord is caused to move upward and, in conjunction with this movement of the third weight, the fourth weight attached to the opposite end of the second cord is caused to move downward.

When a state where the first cord is wrapped around the outer peripheral surface of the first disk and the second cord is wrapped around the outer peripheral surface of the third disk and a state where the first cord is wrapped around the outer peripheral surface of the second disk and the second cord is wrapped around the outer peripheral surface of the fourth disk are repeatedly transitioned at a prescribed interval, it is made possible in the case of the prime mover of claim 8 is capable of rotating the output shaft repeatedly in the forward direction and then in the reverse direction for a long period of time.

In the case of the prime mover according to one embodiment, the prime mover is modified in such manner that the radius of the third disk is made shorter than the radius of the second disk, and that a value to be obtained by subtracting the length of radius of the second disk from the length of radius of the first disk becomes the same as the value to be obtained by subtracting the length of radius of the fourth disk from the length of radius of the third disk.

The prime mover according to one embodiment is capable of preventing the generation of deviation of the second cord.

Effects of the Invention

The prime mover according to one embodiment is capable of effectively converting the potential energy of a weight to the kinetic energy of an output shaft and also capable of rotating the output shaft for a long period of time.

EMBODIMENTS FOR CARRYING OUT THE INVENTION

A prime mover 1 according to one embodiment of the invention will be illustrated according to drawings.

Figure 1:
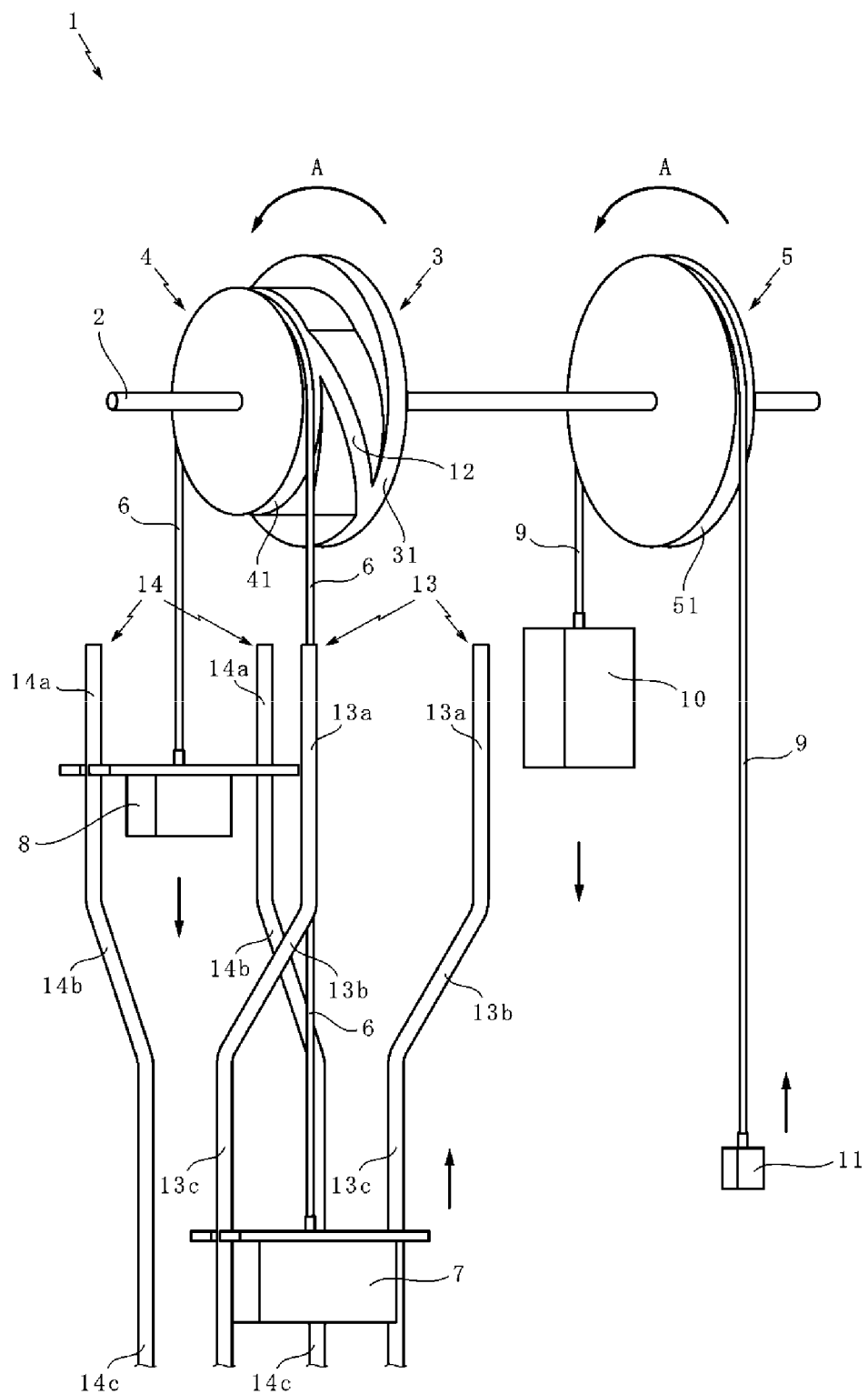
FIG. 1 is a schematic perspective view of the prime mover according to one embodiment of the present invention; illustrating a state wherein the first cord is wound around the second disk.
Figure 2:
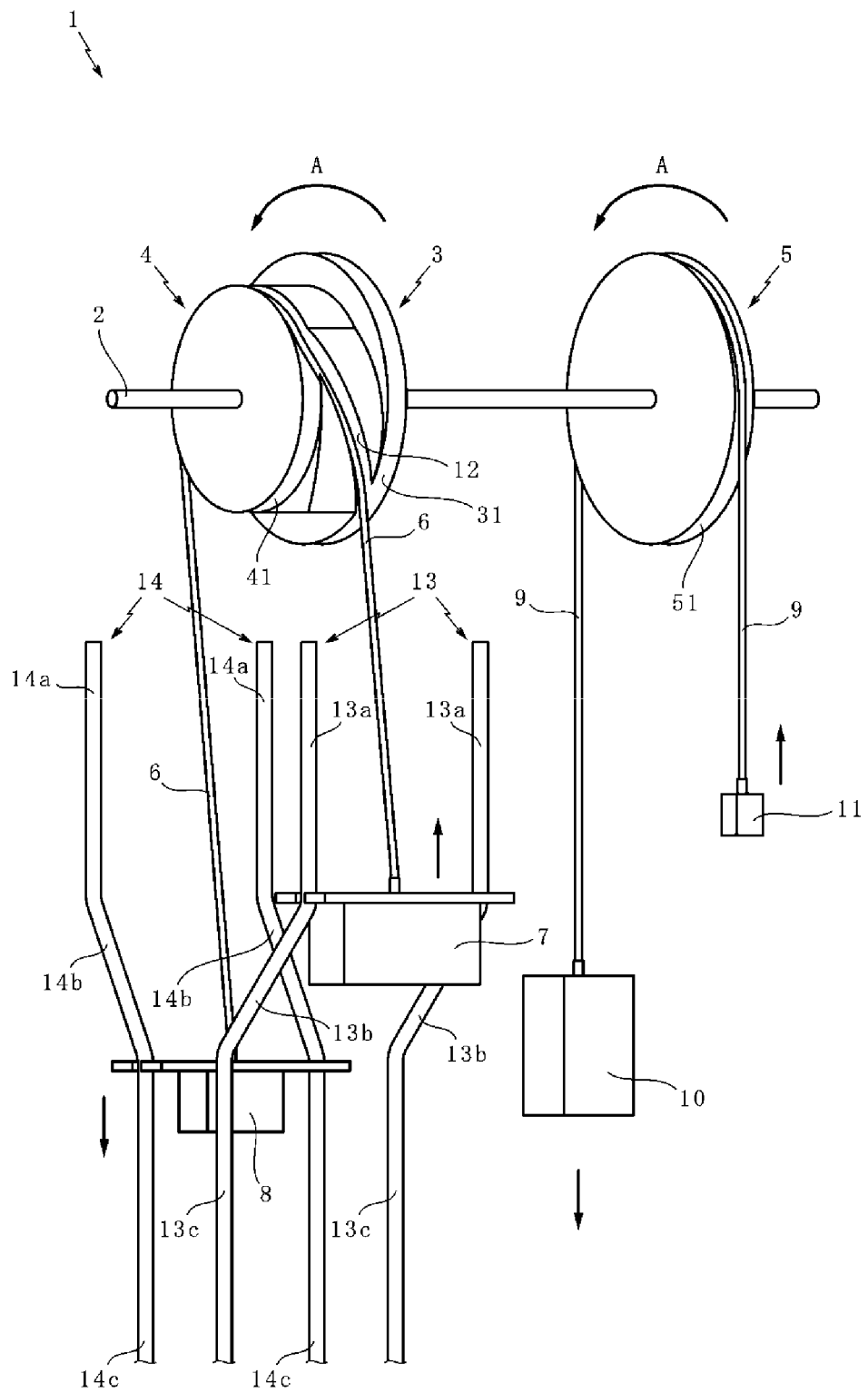
FIG. 2 is a schematic perspective view of the prime mover according to one embodiment of the present invention; illustrating a state wherein the first cord is in the middle of transition from the outer peripheral surface of the second disk to the outer peripheral surface of the first disk.
Figure 3:
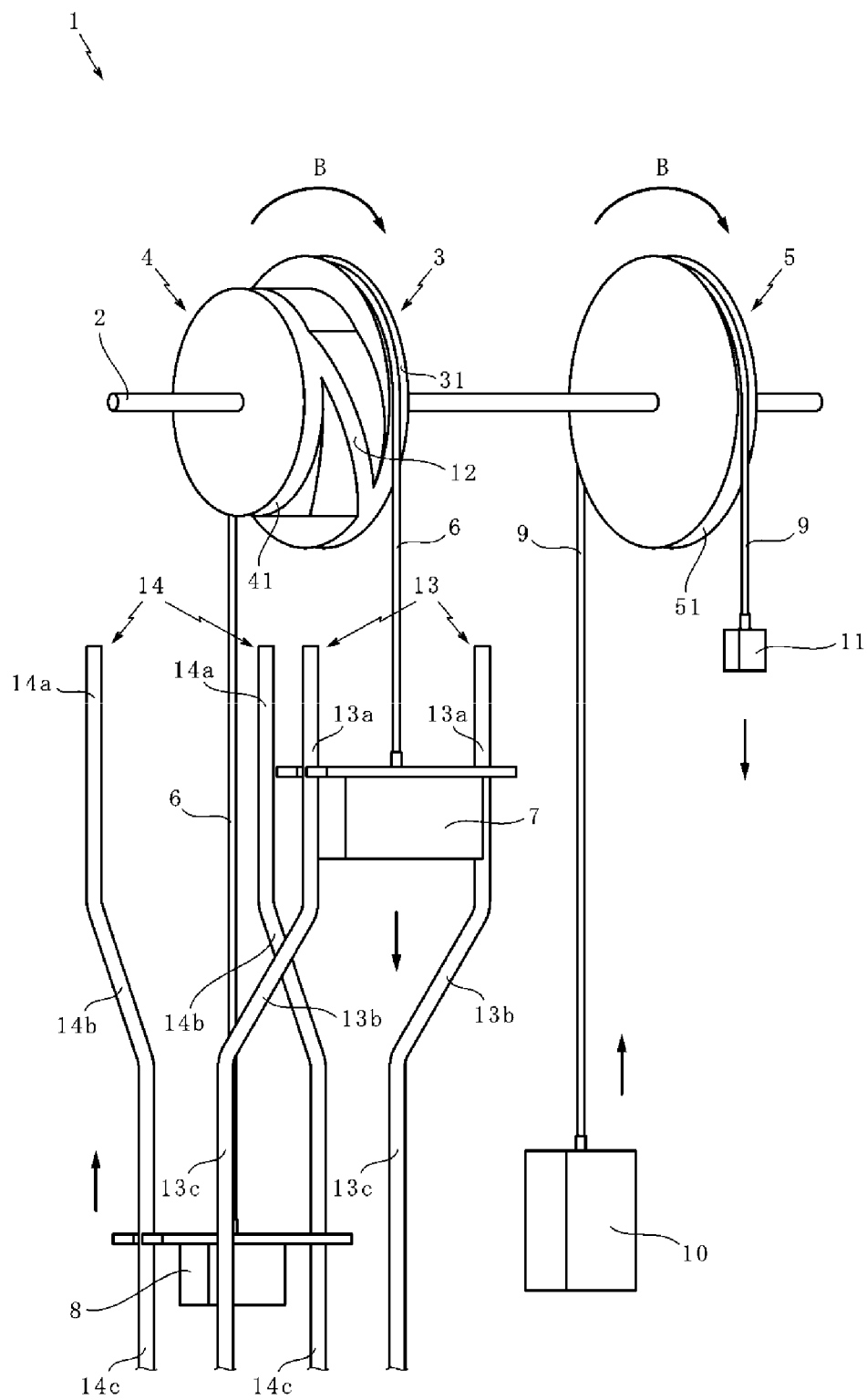
FIG. 3 is a schematic perspective view of the prime mover according to one embodiment of the present invention; illustrating a state wherein the first cord is wound around the first disk.

As shown in FIGS. 1 to 3, the prime mover 1 comprises an output shaft 2, three disks, i.e. a first disk 3, a second disk 4 and a constant torque disk 5, all fixed to the output shaft 2, a first cord 6 wound around either the outer peripheral surface 31 of the first disk 3 or the outer peripheral surface 41 of the second disk 4; a first weight 7 and a second weight 8, both attached respectively to both ends of the first cord 6, a second cord 9 wound around the outer peripheral surface of the constant torque disk 5, and a third weight 10 and a fourth weight 11 both attached respectively to both ends of the second cord 9.

The output shaft 2 is disposed in such a manner that the axis thereof is mounted in perpendicular to the direction of gravity. In the following FIG. 1 and FIG. 2, the rotation of the output shaft 2 in the direction of arrow "A" is regarded as forward rotation and in FIG. 3, the rotation of the output shaft 2 in the direction of arrow "B" is regarded as reverse rotation.

The center of the first disk 3 as well as the center of the second disk 4 is designed so as to match the position of the axis of output shaft 2. Namely, the first disk 3 and the second disk 4 are respectively concentrically fixed to the output shaft 2.

The radius of the first disk 3 is made longer than the radius of the second disk 4.

Not only the outer peripheral surface 31 of the first disk 3 but also the outer peripheral surface 41 of the second disk 4 is provided throughout the circumference thereof with a recessed portion for enabling the first cord 6 wound around thereon to fall therein.

The first disk 3 and the second disk 4 are disposed face to face in the axial direction thereof.

The prime mover 1 is further provided with a guide passageway 12 connecting the outer peripheral surface 31 of the first disk 3 and the outer peripheral surface 41 of the second disk 4.

The guide passage 12 is branched from the outer peripheral surface 31 of the first disk 3 and as it is advanced in the direction of forward rotation, it leaves away from the outer peripheral surface 31 of the first disk 3 in a direction parallel with the direction of axis of shaft from the outer peripheral surface 31 of the first disk 3. Then, it approaches to the outer peripheral surface 41 of the second disk 4 and finally merges with the outer peripheral surface 41 of the second disk 4.

The first cord 6 is enabled to transition via the guide passage 12 between a state where it is wound around the outer peripheral surface 31 of the first disk 3 and a state where it is wound around the outer peripheral surface 41 of the second disk 4.

When the first weight 7 is viewed from the axial direction of the output shaft 2, the first weight 7 is hung down to one side (or the front side as viewed in the cases of FIGS. 1 to 3) of the output shaft 2. Since the first weight 7 is hung down in this manner, a torque which is opposite in direction to a constant torque of the constant torque disk 5 (to be described thereinafter) is enabled to generate in the output shaft 2.

When the second weight 8 is viewed from the axial direction of the output shaft 2, the second weight 8 is hung down to the opposite side (or the back side as viewed in the cases of FIGS. 1 to 3) of the output shaft 2. Since the second weight 8 is hung down in this manner, a torque which is the same in direction to a constant torque of the constant torque disk 5 (to be described thereinafter) is enabled to generate in the output shaft 2.

The first weight 7 is made larger in mass than the second weight 8.

Guiding means 13 for the first weight is disposed at the position which is lower than the first disk 3 and the second disk 4 and where the first weight 7 is hanging down.

The first weight-guiding means 13 is formed of a pair of rods disposed in parallel. The first weight 7 is protruded to both sides in the width direction and is also provided with a play board into which the above-mentioned pair of rods can be loosely inserted. The first weight 7 is always enabled to move up and down through a space between a pair of rods of the first weight-guiding means 13.

Each of the lower portions 13c of the first weight-guiding means 13 is located so as to receive the first weight 7 attached to one end of the first cord 6 at a lower location when the first weight 7 is descended from the second disk 4. Each of the upper portions 13a of the first weight-guiding means 13 is located so as to receive the first weight 7 attached to one end of the first cord 6 at an upper location when the first weight 7 is ascended near to the second disk 4. A middle portion of the first weight-guiding means 13 between the upper portion 13a and the lower portion 13c is connected by an inclined connecting portion 13b.

In a process of upward movement of the first weight 7, the first weight 7 is guided so as to move from a position where one end of the first cord 6 hangs down from the second disk 4 to a position where this one end of the first cord 6 hangs down from the first disk 3.

In a process of downward movement of the first weight 7, the first weight 7 is guided so as to move from a position where one end of the first cord 6 hangs down from the first disk 3 to a position where this one end of the first cord 6 hangs down from the second disk 4.

A second weight-guiding means 14 is disposed below the first disk 3 and the second disk 4 where the second weight 8 hangs down.

The second weight-guiding means 14 is formed of a pair of rods disposed in parallel. The second weight 8 is protruded to both sides in the width direction and is also provided with a play board into which the above-mentioned pair of rods can be loosely inserted. The second weight 8 is always enabled to move up and down through a space between a pair of rods of the second weight-guiding means 14.

Each of the lower portions 14c of the second weight-guiding means 14 is located so as to receive the second weight 8 attached to the other end of the first cord 6 at a lower location when the second weight 8 is descended from the first disk 3. Each of the upper portions 14a of the second weight-guiding means 14 is located so as to receive the second weight 8 attached to the other end of the first cord 6 at an upper location when the second weight 8 is ascended near to the first disk 3. A middle portion of the second weight-guiding means 14 located between the upper portion 14a and the lower portion 14c is connected by an inclined connecting portion 14b.

In a process of downward movement of the second weight 8, the second weight 8 is guided so as to move from a position where the other end of the first cord 6 hangs down from the second disk 4 to a position where the other end of the first cord 6 hangs down from the first disk 3.

In a process of upward movement of the second weight 8, the second weight 8 is guided so as to move from a position where the other end of the first cord 6 hangs down from the first disk 3 to a position where the other end of the first cord 6 hangs down from the second disk 4.

It is designed such that the center of the constant torque disk 5 matches the axial line of the output shaft 2. Namely, the constant torque disk 5 is concentrically fixed to the output shaft 2.

The second cord 9 is wound around the outer peripheral surface 51 of the constant torque disk 5.

The third weight 10 and the fourth weight 11 are respectively attached to both ends of the second cord 9.

The weight 10 is made larger in mass than the fourth weight 11.

When the fourth weight 11 is viewed from the axial direction of the output shaft 2, the fourth weight 11 is hung down to one side or the front side as viewed in the cases of FIGS. 1 to 3 of the output shaft 2.

When the third weight 10 is viewed from the axial direction of the output shaft 2, the third weight 10 is hung down to the other side or the back side as viewed in the cases of FIGS. 1 to 3 of the output shaft 2.

It is designed such that a predetermined torque is applied to the constant torque disk 5, the numerical value of this predetermined torque being determined as follows. Namely, a value to be obtained by subtracting the mass of the fourth weight 11 from the mass of the third weight 10 is multiplied by the gravitational acceleration and then the value thus obtained is further multiplied by the length of the radius of the constant torque disk 5 to obtain the predetermined torque. This predetermined torque is designed to be applied so as to rotate the output shaft 2 in the forward direction.

The operation of the prime mover 1 will be explained as follows.

As shown in FIG. 1, under a state where the first cord 6 is wound around the outer peripheral surface of the second disk 4, a second torque to be generated in the second disk 4 can be calculated based on the following value as explained as follows. A specific value to be obtained by subtracting the mass of the second weight 8 from the mass of the first weight 7 is multiplied by the gravitational acceleration and then the value thus obtained is further multiplied by the length of the radius of the second disk 4, thereby obtaining the specific value. This second torque is smaller than a predetermined torque to be generated in the constant torque disk 5. As a result, the output shaft 2 of the prime mover 1 is enabled to rotate in forward direction.

Due to the rotation of the output shaft 2 of the prime mover 1 in forward direction, the first weight 7 is forced to move upward and the second weight 8 is forced to move downward. In the process of upward movement of the first weight 7 shown in FIG. 2, the first weight 7 is allowed to pass through the connecting portions 13b from the lower portion 13c of the first weigh-guiding means 13 to reach to the position of the upper portions 13a of the first weight-guiding means 13.

As shown in FIG. 2, in the process of upward movement of the first weight 7, the first cord 6 is guided, by way of the guiding passage 12, from a state where it is wound around the outer peripheral surface 41 of the second disk 4 to a state where part of the first cord 6 is guided to the outer peripheral surface 31 of the first disk 3.

When the output shaft 2 of the prime mover 1 is further rotated in forward direction from a state shown in FIG. 2, the first cord 6 is forced to take a state where it is wound around the outer peripheral surface 31 of the first disk 3 as shown in FIG. 3.

As shown in FIG. 3, when the first cord 6 is in a state where it is wound around the outer peripheral surface 31 of the first disk 3, a prescribed torque to be generated in the constant torque disk 5 is made smaller than the first torque to be generated in the first disk 3 when it is calculated based on a specific value which can be obtained as explained below. Namely, a specific value obtained by subtracting the mass of the second weight 8 from the mass of the first weight 7 is multiplied by the gravitational acceleration and then further multiplied by the length of the radius of the first disk 3, thereby obtaining the specific value. As a result, the output shaft 2 of the prime mover 1 is caused to rotate in the reverse direction.

When the output shaft 2 of the prime mover 1 is caused to rotate in the reverse direction, the first weight 7 is moved downward and the second weight 8 is moved upward. In the process of the upward movement of the second weight 8, the second weight 8 is allowed to pass through the connecting portions 14b from the lower portion 14c of the second weight-guiding means 14 to reach to the position of the upper portions 14a of the second weight-guiding means 14.

In the process of upward movement of the second weight 8, the first cord 6 is guided, by way of the guiding passage 12, from a state where it is wound around the outer peripheral surface 31 of the first disk 3 to a state where part of the first cord 6 is guided to the outer peripheral surface 41 of the second disk 4.

When the output shaft 2 of the prime mover 1 is further rotated in reverse direction, the first cord 6 is forced to take a state where it is wound around the outer peripheral surface 41 of the second disk 4 as shown in FIG. 1.

As shown in FIG. 1, in a state where the first cord 6 is wound around the outer peripheral surface of the second disk 4, the output shaft 2 of the prime mover 1 is again caused to rotate in the forward direction.

Accordingly, the prime mover 1 is enabled to transition at a prescribed interval between a state where the first cord 6 is wrapped around the outer peripheral surface 31 of the first disk 3 and a state where the first cord 6 is wrapped around the outer peripheral surface 41 of the second disk 4, thereby making it possible to enable the output shaft 2 to the rotate repeatedly in the forward direction and then in the reverse direction.

Figure 4:
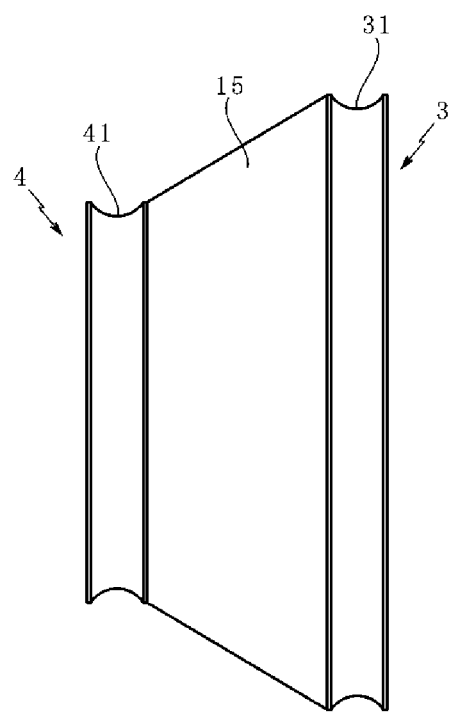
FIG. 4 is a schematic front view of modified examples of the first disk and the second disk.

FIG. 4 shows a modified example of each of the first disk 3 and the second disk 4. The first disk 3 and the second disk 4 are disposed face to face in the axial direction thereof. The prime mover 1 is further provided with an inclined surface 15 constituting a side surface configuration of truncated cone thereby connecting the outer peripheral surface 31 of the first disk 3 and the outer peripheral surface 41 of the second disk 4.

As described above, the first weigh 7 and the second weight 8 are designed to be guided to the first weigh-guiding means 13 and the second weigh-guiding means 14, respectively.

Even if the modified examples of the first disk 3 and the second disk 4 shown in FIG. 4 are employed, the second torque to be generated in the second disk 4 is made smaller than the constant torque to be generated in the constant torque disk 5. As result, the output shaft 2 of the prime mover 1 can be rotated in the forward direction.

When the output shaft 2 of the prime mover 1 is rotated in the forward direction, the first weight 7 moves upward and the second weight 8 moves downward.

In the process of upward movement of the first weight 7, the first cord 6 is guided, along the inclined surface 15, from a state where the first cord 6 is wound around the outer peripheral surface 41 of the second disk 4 to a state where the first cord 6 is wound around the outer peripheral surface 31 of the first disk 3.

In this state, a constant torque to be generated in the constant torque disk 5 is made smaller than the first torque to be generated in the first disk 3. As a result, the output shaft 2 of the prime mover 1 rotates in a reverse direction.

When the output shaft 2 of the prime mover 1 rotates in a reverse direction, the first weight 7 is caused to move downward and the second weight 8 is caused to move upward.

In the process of upward movement of the second weight 8, the first cord 6 is guided, along the inclined surface 15, from a state where the first cord 6 is wound around the outer peripheral surface 31 of the first disk 3 to a state where the first cord 6 is wound around the outer peripheral surface 41 of the second disk 4.

With respect to another embodiment of the present invention, explanation of the portions which are common with the previous embodiment of the prime mover 1 will be omitted and portions different from the previous embodiment will be explained as follows.

Figure 5:
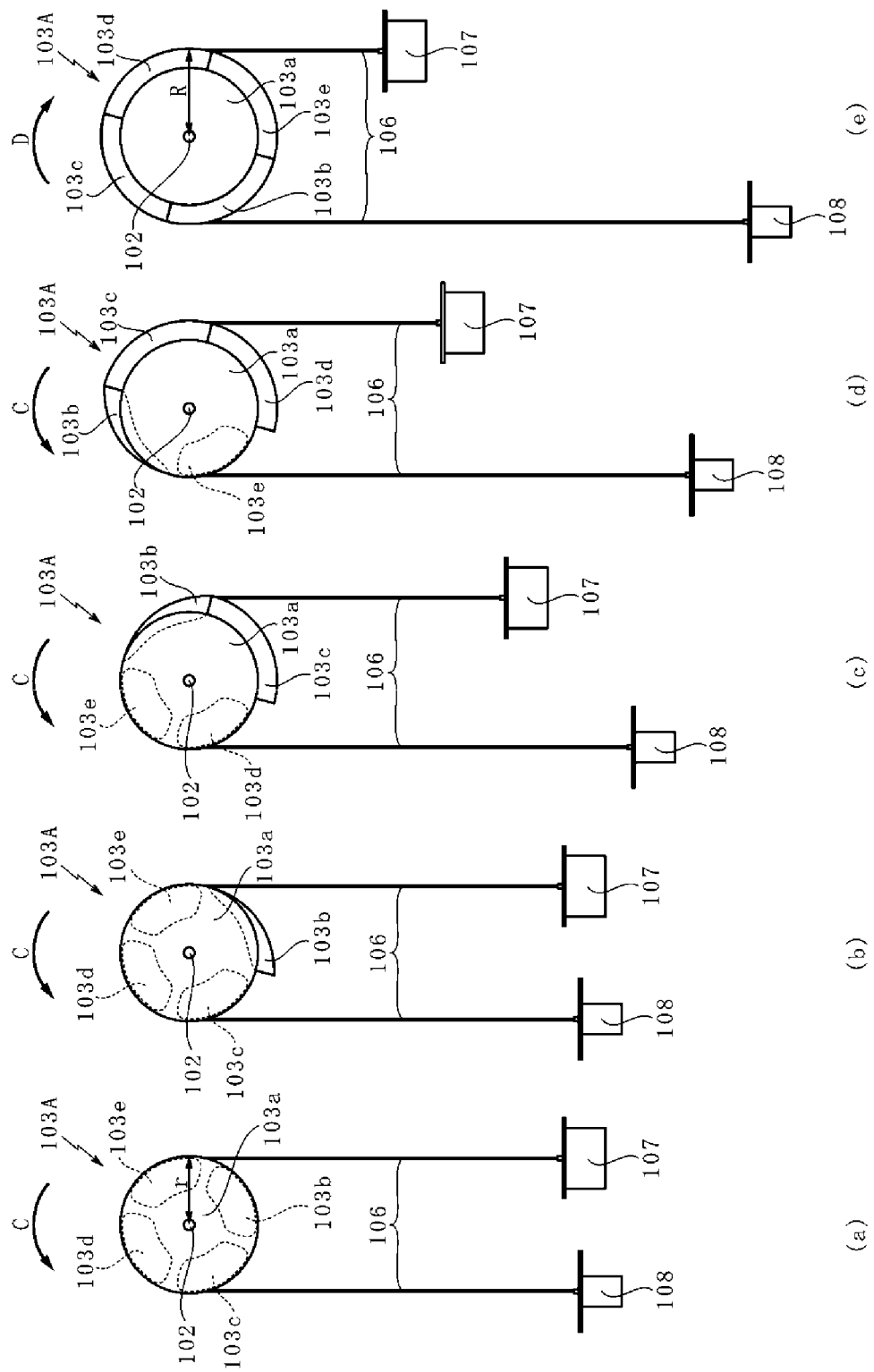
FIG. 5 is a schematic side view of the variable radius disk, the first cord, the first weight and the second weight of the prime mover according to another embodiment of the present invention.

In the case of the prime mover according to this another embodiment, a variable radius disk 103A shown in FIG. 5 is fixed to an output shaft 102 in place of the first disk 3 and the second disk 4 of the prime mover 1 of the aforementioned embodiment.

As shown in FIG. 5, the variable radius disk 103A is designed such that the radius thereof can be changed from a long radius R to a short radius r and vice versa. This variable radius disk 103A is provided with a main portion 103a having the short radius r, with a guiding member 103b enabling it to protrude from the outer periphery of the main body 103a and retracting it to the original position, and with radius expanding portions 103c, 103d and 103e.

In a state where part of the guiding member 103b is protruded from the outer periphery of the main body 103a, one end thereof is located at the outer periphery of the main body 103a. When the guiding member 103b is extended in the circumferential direction, the distance between the surface of the guiding member 103b and the outer periphery of the main body 103a gradually increases.

When the guiding member 103b is entirely protruded from the outer periphery of the main body 103a, the guiding member 103b becomes the same in configuration as that of the radius expanding portions 103c.

When the radius expanding portions 103c, 103d and 103e are protruded from the outer periphery of the main body 103a, these radius expanding portions 103c, 103d and 103e are configured to create a surface which is protruded from the other end of the guiding member 103b.

The cord 106 is wound around the outer peripheral surface of the variable radius disk 103A. The first weight 107 and the second weight 108 are attached to both ends of the cord, respectively.

As shown in FIG. 5(a), in a state where the radius of the variable radius disk 103A takes a short radius "r", the second torque to be generated in the variable radius disk 103A is smaller than a constant torque to be generated in the constant torque disk when the second torque is calculated based on a specific value that can be obtained in such a way that a value obtained by subtracting the mass of the second weight 108 from the mass of the first weight 107 is multiplied by the gravitational acceleration and then further multiplied by the short radius "r" of the variable radius disk 103A, thereby obtaining the specific value. As a result, the output shaft 102 is enabled to rotate in forward direction or in the direction of the arrow "C" as shown in FIG. 5(a).

For example, in a state where the output shaft 102 rotates in forward direction or in the direction of the arrow "C" as shown in FIG. 5(a), the position of the first weight 107 or the second weight 108 is detected by a sensor. When the position of the first weight 107 or the second weight 108 has reached to a predetermined position, a portion of the guiding member 103b is caused to protrude from the outer periphery of the main body 103a as shown in FIG. 5(b).

Then, as shown in FIG. 5(c) and FIG. 5(d), the radius expanding portions 103c, 103d and 103e are successively extruded from the outer periphery of the main body 103a. Finally, as shown in FIG. 5(e), the remaining portion of the guiding member 103b is forced to protrude from the outer periphery of the main body 103a. As a result, the radius of variable radius disk 103A can be extended from the short radius "r" to the long radius "R".

As shown in FIG. 5(e), in a state where the radius of the variable radius disk 103A takes the long radius "R", the constant torque to be generated in the constant torque disk becomes smaller than the first torque to be generated in the variable radius disk 103A when the aforementioned constant torque is calculated based on a specific value that can be obtained from the following calculation formula, i.e. a value obtained by subtracting the mass of the second weight 108 from the mass of the first weight 107 is multiplied by the gravitational acceleration and then further multiplied by the long radius of the variable radius disk 103A, thereby obtaining the aforementioned specific value. As a result, the output shaft 102 is enabled to rotate in reverse direction or in the direction of the arrow "D" as shown in FIG. 5(e).

For example, in a state where the output shaft 102 rotates in reverse direction or in the direction of the arrow "D" as shown in FIG. 5(e), the position of the first weight 107 or the second weight 108 is detected by a sensor. As a result of this detection, when the radius expanding portions 103e, 103d and 103c and a residual portion of the guiding member 103b are successively (or in the order of from FIG. 5(d) to FIG. 5(a)) stored in the main body 103a. As a result, due to the movement of the variable radius disk 103A, it becomes possible to shorten the radius thereof from the long radius "R" to the short radius "r".

Therefore, the prime mover having the variable radius disk 103A shown in FIG. 5 is enabled to transition between a state where the radius of the variable radius disk 103A is long (i.e. the radius "R") and a state where the radius of the variable radius disk is short (i.e. the radius "r") at a prescribed interval, the output shaft 102 is enabled to repeat the rotation of forward direction and the rotation of reverse direction.

Figure 6:
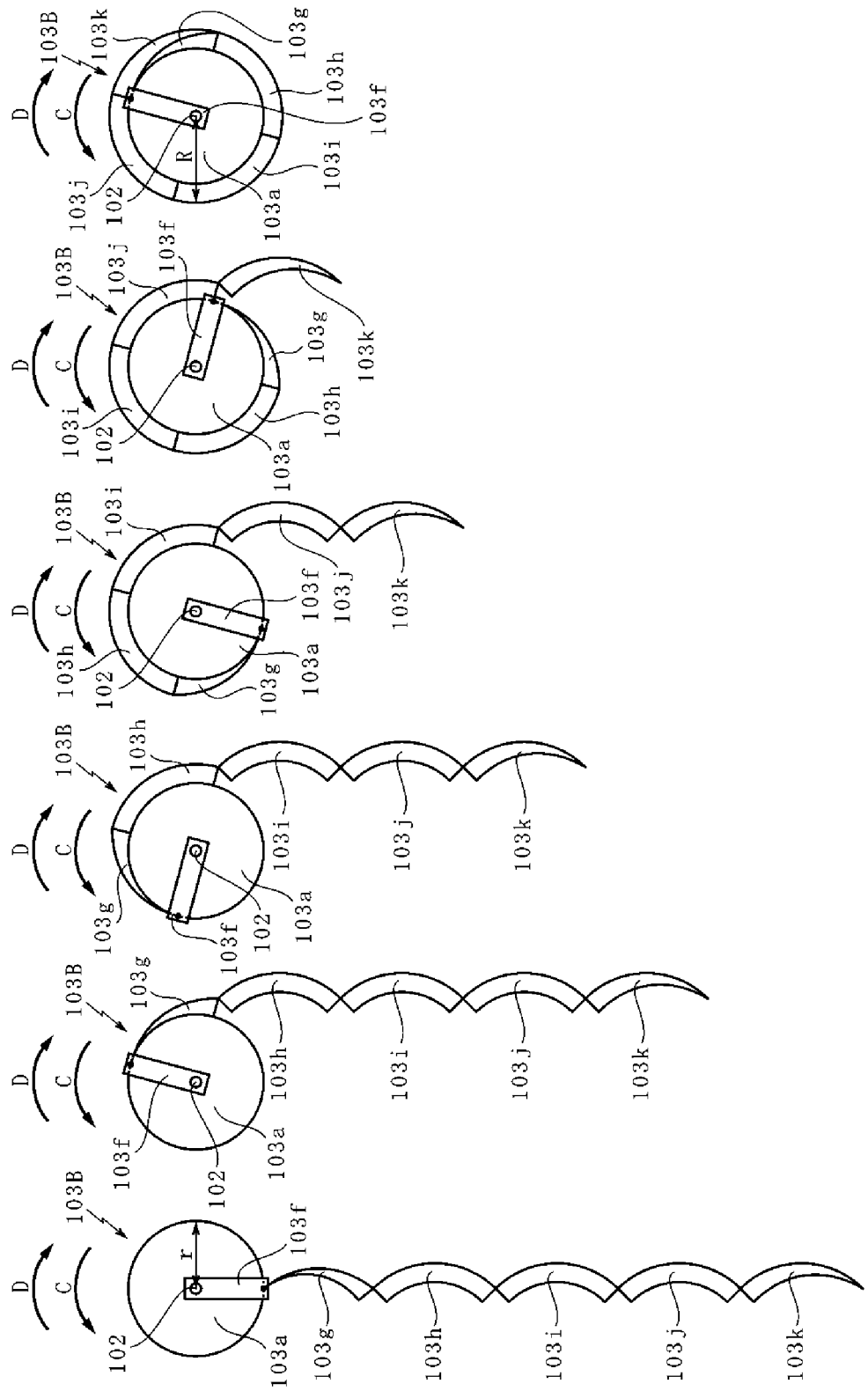
FIG. 6 is a schematic side view of the variable radius disk according to another embodiment of the present invention.

FIG. 6 shows another embodiment of the variable radius disk. This variable radius disk 103B is enabled to change in radius from a short radius "r" to a long radius "R" or vice versa as shown in FIG. 6. This variable radius disk 103B comprises a main body 103a having a short radius "r", a hanging plate 103f hanging from the output shaft 102, a guiding member 103g connected to a low end of the hanging plate 103f, a radius-expanding member 103h connected to a low end of the hanging plate 103g, a radius-expanding member 103i connected to a low end of the radius-expanding member 103h, a radius-expanding member 103j connected to a low end of the radius-expanding member 103i, and a radius-expanding member 103k connected to a low end of the radius-expanding member 103j.

The variable radius disk 103B is fixed to the output shaft 102. On the other hand, the hanging plate 103f is designed such that it is made possible to maintain a hanging state even if the output shaft 102 is rotated.

The guiding member 103g is wound around the outer periphery of the main body 103a and one end thereof is attached to the outer periphery of the main body 103a. When the other end of the guiding member 103g is advanced along the circumference of the main body 103a, the distance between the guiding member 103g and the outer periphery of the main body 103a becomes longer.

In a state where the radius-expanding members 103h, 103i and 103j are wound around the outer periphery of the main body 103a, one end of these radius-expanding members is disposed at the outer periphery of the main body 103a but the other end of these radius-expanding members is disposed to extend in the direction of and along the circumference of the long radius "R".

When the radius-expanding member 103k is wound around the outer periphery of the main body 103a and, at the same time, overlaps with the guiding member 103g, the radius-expanding member 103k becomes the same in configuration with the radius-expanding member 103h.

Followings are explanation of how the variable radius disk 103B can be changed from a state where the radius thereof is short "r" to a state where the radius thereof is long "R".

In a state where the output shaft 102 rotates in forward direction or in the direction of the arrow "C" as shown in FIG. 6(a), the position of the first weight 107 or the second weight 108 is detected by a sensor. When the position of the first weight 107 or the second weight 108 has reached to a predetermined position, the hanging plate 103f is caused to rotate integrally with the main body 103a in the forward direction.

Due to the rotation of the hanging plate 103f, the guiding member 103g is wound around the outer periphery of the main body 103a at first as shown in FIG. 6(b). Then, as shown in FIG. 6(c)~FIG. 6(e), the radius-expanding members 103h, 103i and 103j are successively wound around the outer periphery of the main body 103a. Finally, as shown in FIG. 6(f), the radius-expanding members 103k is caused to wound around the guiding member 103g.

The variable radius disk 103B is enabled to rotate in integral with the guiding member 103g, and the radius-expanding members 103h, 103i, 103j and 103k. When the variable radius disk 103B is kept in this state, the hanging plate 103f rotates continuously in integral with the main body 103a. As a result, the variable radius disk 103B is enabled to change in radius length from the short radius "r" to the long radius "R".

Followings are explanation of how the variable radius disk 103B can be changed from a state where the radius thereof is long "R" to a state where the radius thereof is short "r".

In a state where the output shaft 102 rotates in reverse direction or in the direction of the arrow "D" as shown in FIG. 6(f), the position of the first weight 107 or the second weight 108 is detected by a sensor. When the position of the first weight 107 or the second weight 108 has reached to a predetermined position, the radius-expanding members 103k is caused to hang down from the guiding member 103g so as to change them from a state shown in FIG. 6(f) to a state shown in FIG. 6(e).

Then, as shown in FIG. 6(d)~FIG. 6(b), the radius-expanding members 103h, 103i and 103j leave successively from the outer periphery of the main body 103a. Finally, as shown in FIG. 6(a), the guiding member 103g is caused to leave and hang down from the outer periphery of the main body 103a and the integral rotation of the hanging plate 103f with the main body 103a is released, thereby enabling the hanging plate 103f to hang down from the output shaft 102.

Even if the output shaft 102 is rotated, the hanging plate 103f will be kept in its hang down state. Since only the main body 103a is allowed to rotate, the length of radius of variable radius disk 103B can be shortened from the radius "R" to the radius "r".

Therefore, as in the case of the variable radius disk 103A shown in FIG. 5, the prime mover having the variable radius disk 103B is enabled to transition between a state where the radius of the variable radius disk 103B is long (i.e. the radius "R") and a state where the radius of the variable radius disk 103B is short (i.e. the radius "r") at a prescribed interval, the output shaft 102 is enabled to repeat the rotation of forward direction and the rotation of reverse direction.

In the case of the aforementioned prime mover, when the output shaft is rotated in the forward direction and in the reverse direction, a phenomenon that the third weight and the fourth weight do not return to the initial position before the rotation thereof in the forward direction although the first weight and the second weight are enabled to return to the initial position before the rotation thereof in forward direction. Because of this phenomenon, there is a problem that the rising distance and the falling distance of the third weight and the fourth weight become smaller every time the output shaft repeats the rotations in the forward direction and the reverse direction.

Accordingly, a prime mover 201 according to a different embodiment of the present invention for solving the aforementioned problem will be explained. In this embodiment, the explanation of the portions which are common with the previous embodiment of the prime mover 1 will be omitted and portions different from the previous embodiment will be explained as follows.

As shown in FIGS. 7 to 10, the prime mover 201 is provided with three disks, i.e. a first disk 203, a second disk 204 and a constant torque disk 205. The radius of the first disk 203 is made longer than the radius of the second disk 204. The radius of the second disk 204 is made longer than the radius of the constant torque disk 205.

The prime mover 201 is provided with a position-adjusting means for enabling a third weight 210 and a fourth weight 211 to ascend or descend up to the initial positions thereof before the initiation of the rotation thereof in the forward direction after the rotation of an output shaft 202 in the forward direction and in the reverse direction.

The output shaft 202 is consisted of an output shaft 202b fixed to a constant torque disk 205, an output shaft 202a fixed to a first disk 203 and to a second disk 204 (other than the constant torque disk), and a clutch 202c which is disposed between the output shaft 202a and the output shaft 202b. In a state where the clutch 202c is engaged, the output shaft 202a and the output shaft 202b are enabled to integrally rotate. In a state where the clutch 202c is disengaged, the output shaft 202a and the output shaft 202b are enabled to independently rotate.

The position-adjusting means is provided with the clutch 202c and a motor "M" for rotating the output shaft 202b.

Followings are explanation about the behavior of the prime mover 201 provided with the position-adjusting means.

Figure 7:
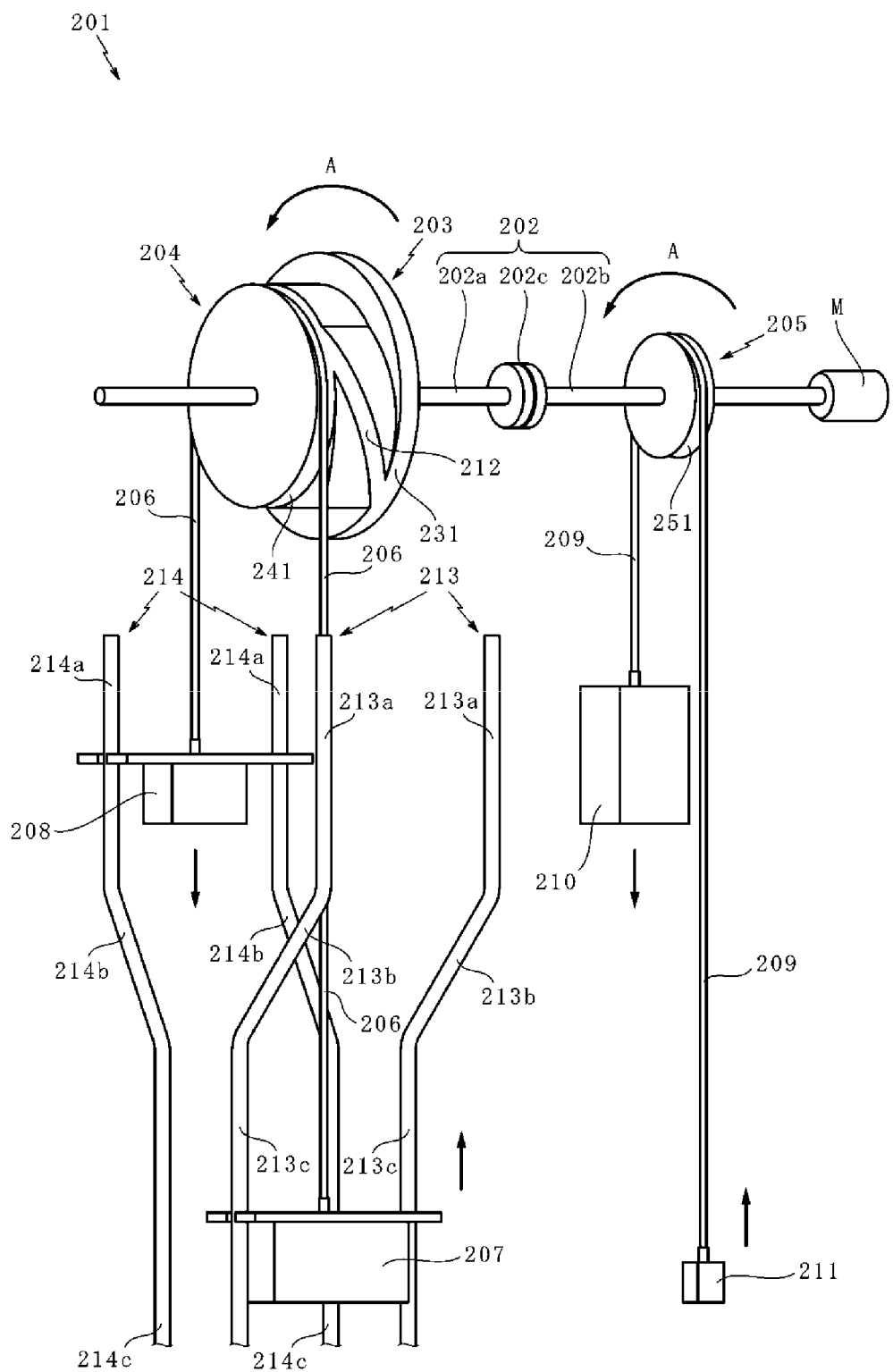
FIG. 7 is a schematic perspective view of a prime mover having position-adjusting means according to another embodiment of the present invention, illustrating a state wherein the first cord is wound around the outer peripheral surface of the second disk.

As shown in FIG. 7, in a state where the clutch 202c is engaged and a first cord 206 is wound around the outer peripheral surface of the second disk 204, a second torque to be generated in the second disk 204 as it is calculated based on the value to be obtained through not only the multiplication of a value to be obtained through subtraction of the mass of the second weight 208 from the mass of the first weight 207 by the gravitational acceleration but also a further multiplication thereof by the length of the radius of the second disk 204 is made smaller than a constant torque to be generated in the constant disk 205. As a result, the output shaft 202 of the prime mover 201 is caused to rotate in the forward direction.

The position of the second weight 208 before the rotation thereof in forward direction as shown in FIG. 6 becomes the initial position of the second weight 208. The position of the third weight 210 before the rotation thereof in forward direction as shown in FIG. 7 becomes the initial position of the third weight 210.

When the output shaft 202 of the prime mover 201 is rotated in the forward direction, the first weight 207 is caused to ascend and the second weight 208 is caused to descend. In a process where the first weight 207 ascends, it is enabled to move from a lower portion 213c of a first weight-guiding means 213 and to pass through a connecting portion 213b, thereby making it possible to take the position of an upper portion 213a of the first weight-guiding means 213.

In a process where the first weight 207 ascends, the first cord 206 is enabled to move from a state where the first cord 206 is wound around the outer peripheral surface 241 of the second disk 204 to a state where a portion of the first cord 206 is guided by way of a guiding passage 212 to the outer peripheral surface 231 of the first disk 203.

Figure 8:
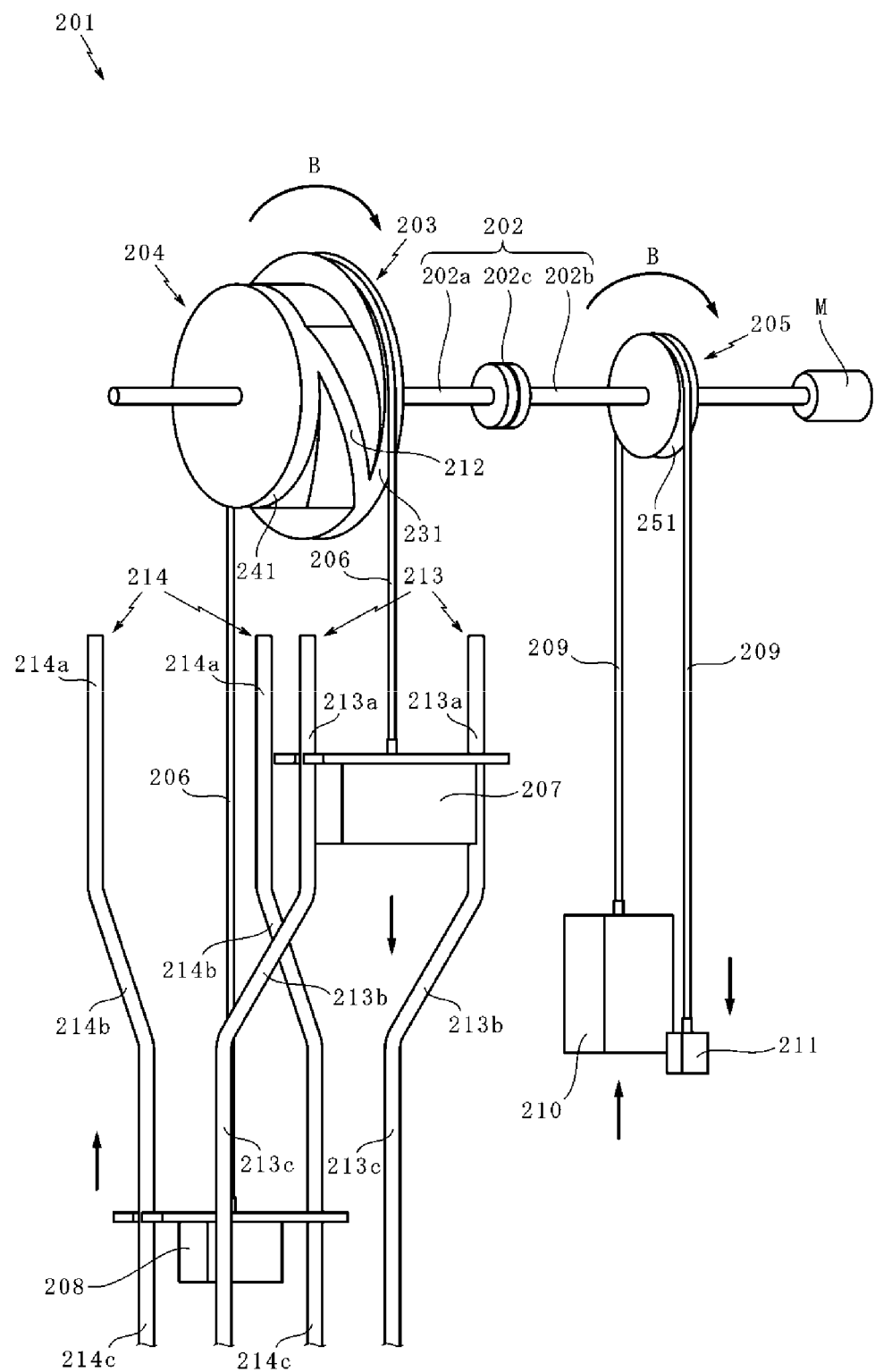
FIG. 8 is a schematic perspective view of a prime mover having position-adjusting means according to another embodiment of the present invention, illustrating a state wherein the first cord is wound around the outer peripheral surface of the first disk.

When the output shaft 202 of the prime mover 201 is further rotated in the forward direction, the first cord 206 is wound around the outer peripheral surface 231 of the first disk 203 as shown in FIG. 8.

A ratio of the descending magnitude of the second weight 208 in relative to the descending magnitude of the third weight 210 becomes the same as the ratio of the radius of second disk 204 in relative to the radius of constant torque disk 205. Namely, as shown in FIG. 8, in the case of the prime mover 201, the descending magnitude of the third weight 210 becomes smaller than the descending magnitude of the second weight 208.

In a state where the first cord 206 is wound around the outer peripheral surface 231 of the first disk 203 as shown in FIG. 8, a constant torque to be generated in the constant disk 205 becomes smaller than the first torque to be generated in the first disk 203 when it is calculated based on a specific value to be obtained in such a way that a value to be obtained by subtracting the mass of the second weight 208 from the mass of the first weight 207 is multiplied by the gravitational acceleration and then the value thus obtained is further multiplied by the length of the radius of the first disk 203 to obtain the specific value. As a result, the output shaft 202 of the prime mover 201 is enabled to rotate in the reverse direction.

When the output shaft 202 of the prime mover 201 is rotated in the reverse direction, the first weight 207 moves downward and the second weight 208 moves upward. In a process where the second weight 208 is moved upward, the second weight 208 is enabled to move from the lower portion 214c of the second weight-guiding means 214 and to pass through the connecting portion 214b, thereby making it possible to take the position of an upper portion 214a of the second weight-guiding means 214.

In a process where the second weight 208 moves upward, the first cord 206 is enabled to move from a state where the first cord 206 is wound around the outer peripheral surface 231 of the first disk 203 to a state where a portion of the first cord 206 is guided by way of a guiding passage 212 to the outer peripheral surface 241 of the second disk 204.

Figure 9:
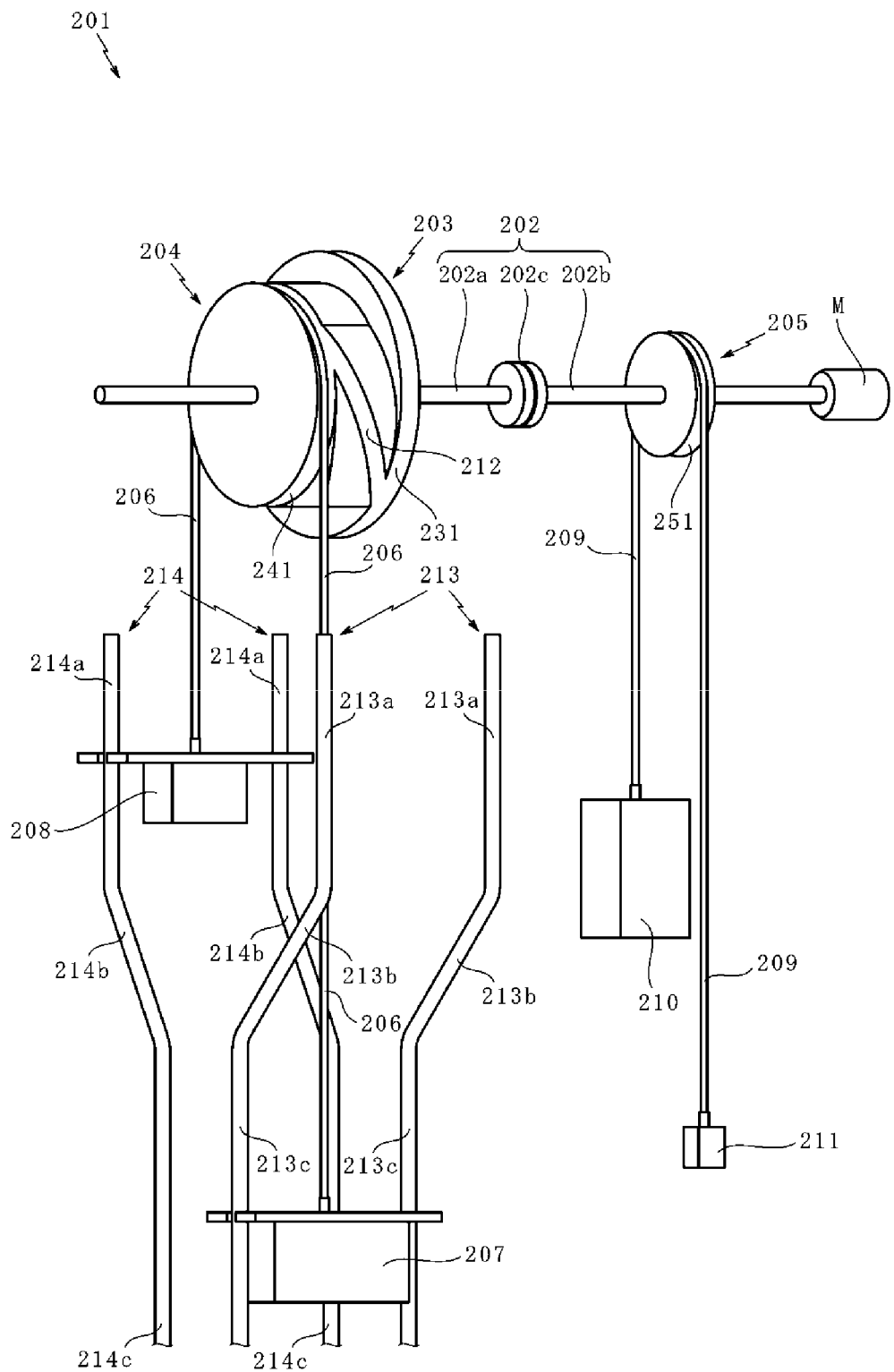
FIG. 9 is a schematic perspective view of a prime mover having position-adjusting means according to another embodiment of the present invention, illustrating a state wherein the second cord is deviated.
Figure 10:
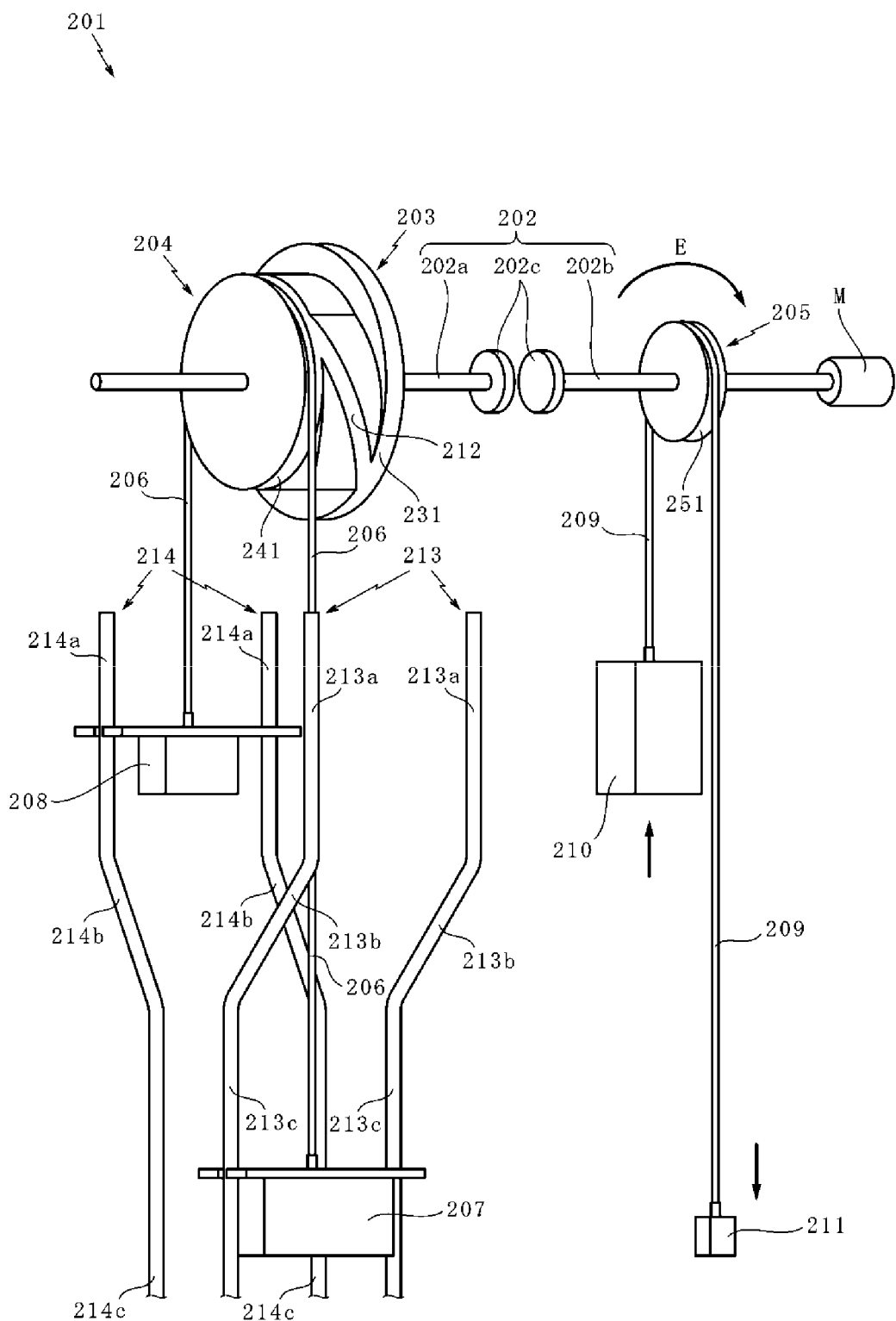
FIG. 10 is a schematic perspective view of a prime mover having position-adjusting means according to another embodiment of the present invention, illustrating a state wherein the deviation of the second cord is removed.

When the output shaft 202 of the prime mover 201 is further rotated in the reverse direction, the first cord 206 is wound around the outer peripheral surface 241 of the second disk 204 as shown in FIG. 9.

A ratio of the ascending magnitude of the second weight 208 in relative to the ascending magnitude of the third weight 210 becomes the same as the ratio of the radius of first disk 203 in relative to the radius of constant torque disk 205. Namely, as shown in FIG. 9, in the case of the prime mover 201, the ascending magnitude of the third weight 210 becomes smaller than the ascending magnitude of the second weight 208.

When the output shaft 202 in a state shown in FIG. 7 is rotated in the forward direction, thereby turning it in a state shown in FIG. 8 and is further rotated in the reverse direction, thereby turning it in a state shown in FIG. 9, the third weight 210 cannot be returned to the initial position even if the second weight 208 is enabled to return to the initial position.

Because of this, when the cycle of rotation, i.e. the rotation of the output shaft 202 in forward direction and then the rotation of the output shaft 202 in reverse direction for returning the second weight 208 to the initial position thereof is repeated, the position for initiating the descending of the third weight 210 becomes lower and lower, thereby generating a deviation in the second cord 209 wound around the outer periphery 251 of the constant torque disk 205.

The deviation of the second cord 209 gives rise to the restriction of not only the descending magnitude of the second weight 208 but also the ascending magnitude of the first weight 207 on the occasion of the rotation of the output shaft 202 in the forward direction. Furthermore, the deviation of the second cord 209 gives rise to the restriction of not only the ascending magnitude of the second weight 208 but also the descending magnitude of the first weight 207 on the occasion of the rotation of the output shaft 202 in the reverse direction.

Because of this, the prime mover 201 is designed such that only the output shaft 202b is caused to rotate in the direction of the arrow "E" by making use of the motor "M" and by disengaging the clutch 202c, thereby moving the third weight 210 upward until it reaches the initial position thereof. In a state where the clutch 202c is disengaged, the prime mover 201 is incapable of rotating the output shaft 202a. Then, by engaging the clutch 202c, the prime mover 201 is enabled to return to the state shown in FIG. 7.

The prime mover 201 is designed such that the deviation of the second cord 209 can be removed by means of the position-adjusting means. Further, the prime mover 201 is designed such that, while periodically removing the deviation of the second cord 209, a state where the first cord 206 is wrapped around the outer peripheral surface 231 of the first disk 203 and a state where the first cord 206 is wrapped around the outer peripheral surface 241 of the second disk 204 can be repeatedly transitioned at a prescribed interval, thereby making it possible to rotate the output shaft 202 repeatedly in the forward direction and then in the reverse direction.

In another embodiment of the present invention where the prime mover 301 is intended to prevent the generation of the deviation of the second cord will be explained. In this explanation, the portions which are common with the previous embodiment of the prime mover 1 will be omitted and portions different from the previous embodiment will be explained as follows.

The prime mover 301 is provided with four disks, i.e. a first disk 303, a second disk 304, a third disk 305A and a fourth disk 305B. The prime mover 301 is configured such that the third disk 305A and the fourth disk 305B are secured to the output shaft 302 in place of the constant torque disk of the prime mover 1 of the previous embodiment.

The radius of the first disk 303 is made longer than the radius of the second disk 304. The radius of the second disk 304 is made longer than the radius of the third disk 305A. The radius of third disk 305A is made longer than the radius of the fourth disk 305B.

The value to be obtained by subtracting the length of radius of the second disk 304 from the length of radius of the first disk 303 matches the value to be obtained by subtracting the length of radius of the fourth disk 305B from the length of radius of the third disk 305A.

The prime mover 301 is further provided with a guiding passage 351C which connects the outer peripheral surface 351A of the third disk 305A and the outer peripheral surface 351B of the fourth disk 305B.

The guide passage 351C is branched from the outer peripheral surface 351A of the third disk 305A and as it is advanced in the direction of forward rotation, it leaves away from the outer peripheral surface 351A of the third disk 305A in a direction parallel with the direction of axis of shaft. Then, it approaches to the outer peripheral surface 351B of the fourth disk 305B and finally merges with the outer peripheral surface 351B of the fourth disk 305B.

The second cord 309 is enabled to transition via the guide passage 351C between a state where it is wound around the outer peripheral surface 351A of the third disk 305A and a state where it is wound around the outer peripheral surface 351B of the fourth disk 305B.

Figure 11:
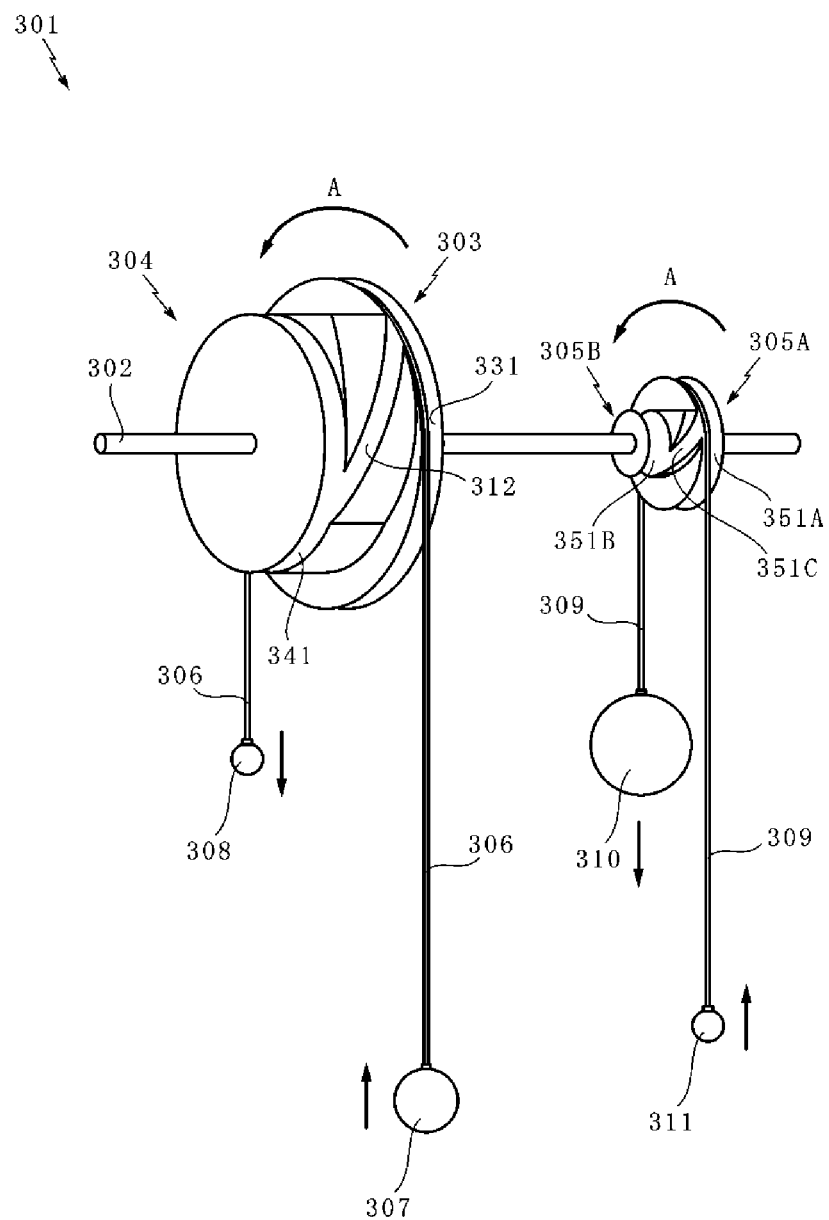
FIG. 11 is a schematic perspective view of a prime mover which is designed to prevent the generation of the deviation of the second cord according to another embodiment of the present invention, illustrating a state wherein the first cord is wound around the outer peripheral surface of the first disk and the second cord is wound around the outer peripheral surface of the third disk.
Figure 12:
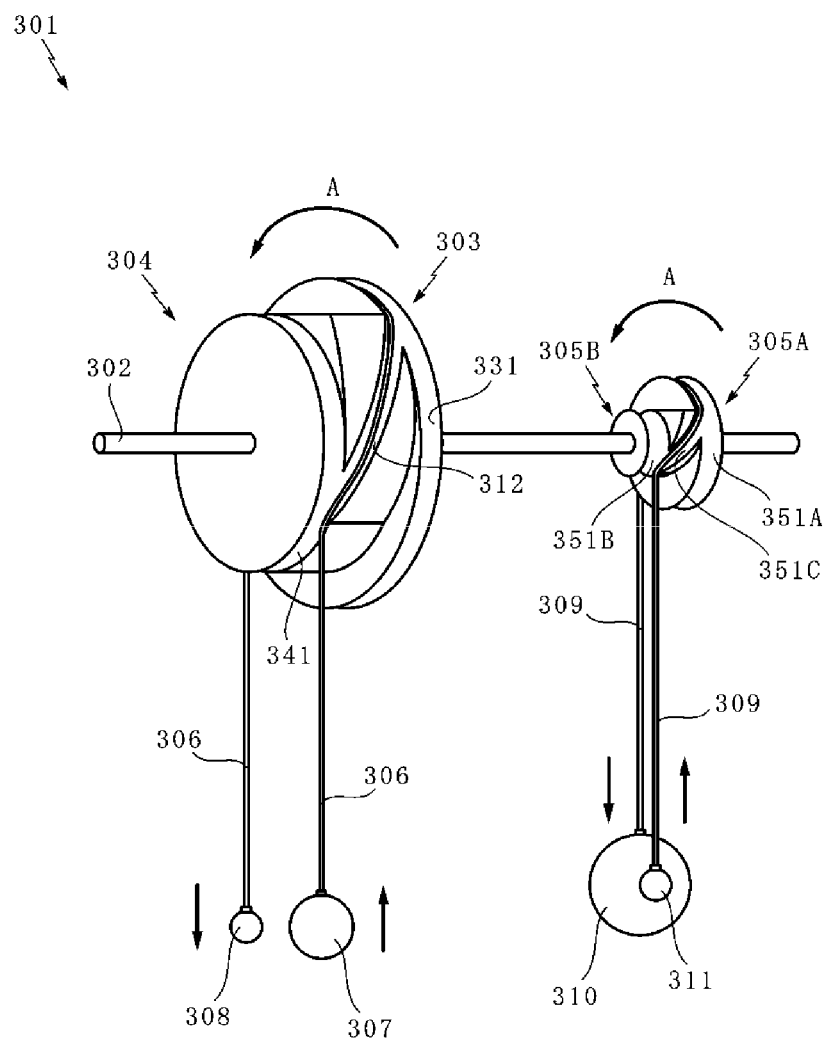
FIG. 12 is a schematic perspective view of a prime mover which is designed to prevent the generation of the deviation of the second cord according to another embodiment of the present invention, illustrating a state wherein the first cord is in the middle of transition from the outer peripheral surface of the first disk to the outer peripheral surface of the second disk and a state wherein the first cord is in the middle of transition from the outer peripheral surface of the third disk to the outer peripheral surface of the fourth disk.
Figure 13:
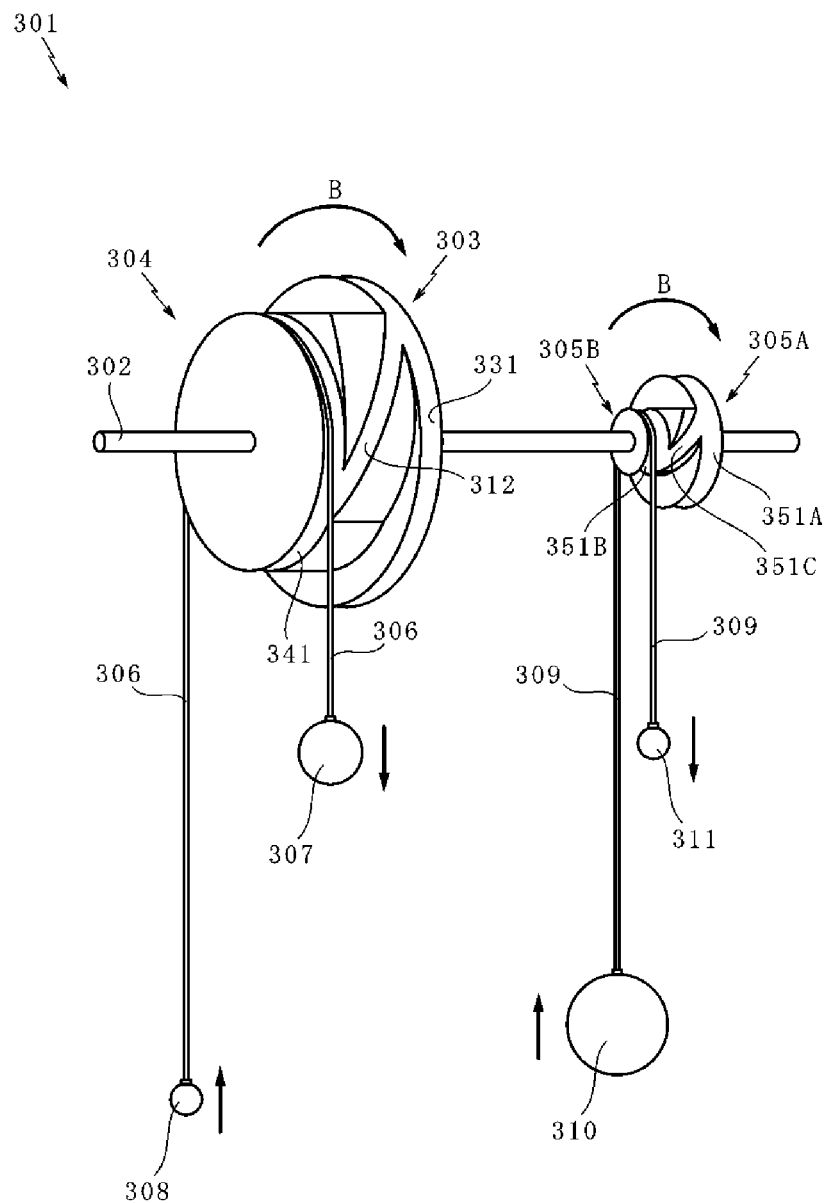
FIG. 13 is a schematic perspective view of a prime mover which is designed to prevent the generation of the deviation of the second cord according to another embodiment of the present invention, illustrating a state wherein the first cord is wound around the outer peripheral surface of the second disk and the second cord is wound around the outer peripheral surface of the fourth disk, further illustrating a state wherein the first cord is wound around the outer peripheral surface of the first disk and the second cord is wound around the outer peripheral surface of the third disk.

Although it is not described in FIGS. 11~13, the prime mover 301 is provided with guiding means for guiding the first weight 307~the fourth weight 311, respectively. By way of each of the guiding means, the first weight 307~the fourth weight 311, each of the weights can be guided to a prescribed position in the process of ascending and descending each of the weights.

Due to the guiding of the first weight 307 and the second weight 308 by means of each of guiding means, a first cord 306 is enabled to transition between a state where it is wound around the outer peripheral surface 331 of the first disk 303 and a state where it is wound around the outer peripheral surface 341 of the second disk 304.

Due to the guiding of the third weight 310 and the fourth weight 311 by means of each of guiding means, a second cord 309 is enabled to transition between a state where it is wound around the outer peripheral surface 351A of the third disk 305A and a state where it is wound around the outer peripheral surface 351B of the fourth disk 305B.

The behavior of the prime mover 301 will be explained with reference with FIGS. 11~13.

As shown in FIG. 11, in a state where the first cord 306 is wound around the outer peripheral surface 331 of the first disk 306 and, at the same time, the second cord 309 is wound around the outer peripheral surface 351A of the third disk 305A, a first torque to be generated in the first disk 303 is smaller than a third torque to be generated in the third disk 305A when the first torque is calculated based on a specific value to be obtained in such a way that a value to be obtained through subtraction of the mass of the second weight 308 from the mass of the first weight 307 is multiplied by the gravitational acceleration and further multiplied by the length of the radius of the first disk 303 to obtain the specific value and when the third torque is calculated based a specific value to be obtained in such a way that a value to be obtained through subtraction of the mass of the fourth weight 311 from the mass of the third weight 310 is multiplied by the gravitational acceleration and further multiplied by the length of the radius of the third disk 305A to obtain the specific value. As a result, the output shaft 302 of the prime mover 301 is caused to rotate in the forward direction indicated by an arrow "A".

When the output shaft 302 of the prime mover 301 is rotated in the forward direction, the first weight 307 and the fourth weight 311 move upward and at the same time, the second weight 308 and the third weight 310 move downward. In a process where the first weight 307 is moved upward, the first cord 306 is shifted from a state where one end of the first weight 306 hangs down from the first disk 303 as shown in FIG. 11 to a state where one end of the first cord 306 hangs down from the second disk 304 as shown in FIG. 12. Likewise, In a process where the fourth weight 311 is moved upward, the second cord 309 is shifted from a state where one end of the second cord 309 hangs down from the third disk 305A as shown in FIG. 11 to a state where one end of the second cord 309 hangs down from the fourth disk 305B as shown in FIG. 12.

As shown in FIG. 12, in a process where the first weight 307 is moved upward, the first cord 306 is guided, by way of the guiding passage 312, from a state where the first cord 306 is wound around the outer peripheral surface 331 of the first disk 303 to a state where a portion of the first cord 306 is wound around the outer peripheral surface 341 of the second disk 304.

Likewise, as shown in FIG. 12, in a process where the fourth weight 311 moves upward, the second cord 309 is shifted from a state where the second cord 309 is wound around the outer peripheral surface 351A of the third disk 305A to a state where a portion of the second cord 309 is guided by way of a guiding passage 351C to the outer peripheral surface 351B of the fourth disk 305B.

When the output shaft 302 of the prime mover 301 is further rotated in the forward direction from a state shown in FIG. 12, the first cord 306 is wound around the outer peripheral surface 341 of the second disk 304 and the second cord 309 is wound around the outer peripheral surface 351B of the fourth disk 305B as shown in FIG. 13.

As shown in FIG. 13, in a state where the first cord 306 is wound around the outer peripheral surface 341 of the second disk 304 and, at the same time, the second cord 309 is wound around the outer peripheral surface 351B of the fourth disk 305B, a second torque to be generated in the second disk 304 is larger than a fourth torque to be generated in the fourth disk 305 when the second torque is calculated based on a specific value to be obtained in such a way that a value to be obtained through subtraction of the mass of the second weight 308 from the mass of the first weight 307 is multiplied by the gravitational acceleration and further multiplied by the length of the radius of the second disk 304, thereby obtaining the specific value and when the fourth torque is calculated based on a specific value to be obtained in such a way that a value to be obtained through subtraction of the mass of the fourth weight 311 from the mass of the third weight 310 is multiplied by the gravitational acceleration and further multiplied by the length of the radius of the fourth disk 305B, thereby obtaining the specific value. As a result, the output shaft 302 of the prime mover 301 is caused to rotate in the reverse direction indicated by an arrow "B".

When the output shaft 302 of the prime mover 301 is rotated in the reverse direction, the first weight 307 and the fourth weight 311 move downward and at the same time, the second weight 308 and the third weight 310 move upward. In a process where the second weight 308 is moved upward, the first cord 306 is guided from a state where the other end of the first weight 306 hangs down from the second disk 304 to a state where the other end of the first cord 306 hangs down from the first disk 303. Likewise, In a process where the third weight 310 is moved upward, a state where the other end of the second cord 309 hangs down from the fourth disk 305B is guided to a state where the other end of the second cord 309 hangs down from the third disk 305A.

In a process where the second weight 308 is moved upward, the first cord 306 is guided, by way of the guiding passage 312, from a state where the first cord 306 is wound around the outer peripheral surface 341 of the second disk 304 to a state where a portion of the first cord 306 is wound around the outer peripheral surface 331 of the first disk 303.

In a process where the third weight 310 is moved upward, the second cord 309 is guided, by way of the guiding passage 315C, from a state where the second cord 309 is wound around the outer peripheral surface 351B of the fourth disk 305B to a state where a portion of the second cord 309 is wound around the outer peripheral surface 351A of the third disk 305A.

When the output shaft 302 of the prime mover 301 is further rotated in reverse direction, there is created a state where the first cord 306 is wound around the outer peripheral surface 331 of the first disk 303 and the second cord 309 is wound around the outer peripheral surface 351A of the third disk 305A as shown in FIG. 11.

As shown in FIG. 11, in a state where the first cord 306 is wound around the outer peripheral surface 331 of the first disk 303 and the second cord 309 is wound around the outer peripheral surface 351A of the third disk 305A, the output shaft 302 of the prime mover 301 is again rotated in the forward direction.

Therefore, the prime mover 301 is enabled to transition at a predetermined interval between a state where the first cord 306 is wound around the outer peripheral surface 331 of the first disk 303 and the second cord 309 is wound around the outer peripheral surface 351A of the third disk 305A and a state where the first cord 306 is wound around the outer peripheral surface 341 of the second disk 304 and the second cord 309 is wound around the outer peripheral surface 351B of the fourth disk 305B, the output shaft 302 is enabled to repeat the rotation of forward direction and the rotation of reverse direction.

The value to be obtained by subtracting the length of radius of the second disk 304 from the length of radius of the first disk 303 matches the value to be obtained by subtracting the length of radius of the fourth disk 305B from the length of radius of the third disk 305A. Because of this, in the case where the output shaft 302 of the prime mover 301 is rotated in the forward direction and in the reverse direction, when the first weight 307 and the second weight 308 return to the initial position before the rotation of forward direction as shown in FIG. 11, the third weight 310 and the fourth weight 311 are enabled to return to the initial position before the rotation thereof in forward direction. Accordingly, even if the output shaft of the prime mover 301 is repeatedly rotated in the forward direction and the reverse direction, it is possible to prevent the generation of deviation of the second cord 309.

In the case of the aforementioned embodiment, the prime mover 1 is explained in a case where it is provided with three disks, i.e. the first disk, the second disk and the constant torque disk. However, this invention is not limited such a case. Namely, the prime mover may be provided with four or more disks for example.

In the case of the aforementioned embodiment, this invention is explained in a case where a recessed portion for enabling the first cord 6 to fall therein throughout the entire peripheral surface of the outer peripheral surface 31 of the first disk 3 and also the entire peripheral surface of the outer peripheral surface 41 of the first disk 4. However, this invention is not limited to such a case. Namely, the first disk and the second disk may be respectively formed of a gear so that the teeth thereof may be formed not only on the outer peripheral surface of the first disk but also on the outer peripheral surface of the second disk and the cord may be a chain which is capable of engaging with the gear.

In the case of the aforementioned embodiment, there is explained in a case where the external configuration of the first weights 7 and 107 is larger than that of the second weights 8 and 108. However, this invention is not restricted to such a case. As long as the first weight is larger in mass than that of the second weight, the external configuration of the first weight may be the same as that of the second weight.

In the case of the aforementioned embodiment, there is explained in a case where the second cord 9 is wound around the outer peripheral surface 51 of the constant torque disk 5 and the third weight 10 and the fourth weight 11 are attached respectively to both end of the second cord 9. However, this invention is not restricted to such a case. For example, in order to generate a constant torque in the constant torque disk, one end of the second cord may be fixed to the outer peripheral surface of the constant torque disk and a weight may be attached to the other end of the second cord.

In the case of the aforementioned embodiment, there is explained in a case where the first weight-guiding means 13 and the second weight-guiding means 14 are constituted by a pair of bars disposed parallel with each other. However, this invention is not restricted to such a case. By making use of a combination of rail and guide or by making use of a ball spline in place of the first weight-guiding means and the second weight-guiding means, the first weight and the second weight may be guided.

In the case of the aforementioned embodiment, the employment of the variable radius disks 103A and 103B is explained in the embodiment shown in FIGS. 5 and 6, the structure shown therein is merely one example thereof and this invention is not limited to such a structure. The variable radius disk may be substituted by other structures for realizing a state where the radius is short and the radius is long.

In the case of the aforementioned embodiment, there is explained in a case where the prime mover 201 is constructed such that the radius of the first disk 203 is made longer than that of the second disk 204 and the radius of the second disk 204 is made longer than that of the constant torque disk 205. However, this invention is not restricted to such a case. The prime mover may be modified in such a manner that the combination of the length of radius among the first disk, the second disk and the constant torque disk may be freely altered. For example, the radius of the first disk is made longer than that of the constant torque disk, and the radius of the constant torque disk is made longer than the radius of the second disk.

In the case of the aforementioned embodiment, there is explained in a case where the external configuration of the first weight 307 is larger than that of the second weight 308 and the external configuration of the third weight 310 is larger than that of the fourth weight 311 as shown in FIGS. 11 to 13. However, this invention is not restricted to such a case. As long as the first weight is larger in mass than that of the second weight and, at the same time, the third weight is larger in mass than that of the fourth weight, the external configuration of each of the first weight, the second weight, the third weight and the fourth weight may be the same with each other.

In the case of the aforementioned embodiment, the prime mover 301 is explained in a case where it is provided with four disks, i.e. the first disk, the second disk, the third disk and the fourth disk. However, this invention is not limited such a case. Namely, the prime mover may be provided with five or more disks for example.

EXPLANATION OF SYMBOLS

1 Prime mover
2 Output shaft
3 First disk
4 Second disk
5 Constant torque disk
6 First cord
7 First weight
8 Second weight
9 Second cord
10 Third weight
11 Fourth weight
12 Guide passage
13 First weight-guiding means
13a Upper portion
13b Connecting portion
13c Lower portion
14 Second weight-guiding means
14a Upper portion
14b Connecting portion
14c Lower portion
15 Inclined surface
31 Outer circumferential surface
41 Outer circumferential surface
51 Outer circumferential surface
101 Prime mover
102 Output shaft
103A Variable radius disk
103a Main body
103b Guiding member
103c, 103d, 103e Radius-expanding member
103f Hanging plate
103g Guiding member
103h, 103i, 103j, 103k Radius-expanding member
106 Cord
107 First weight
108 Second weight
201 Prime mover
202 Output shaft
202a Output shaft
202b Output shaft
202c Clutch
203 First disk
204 Second disk
205 Constant torque disk
206 First cord
207 First weight
208 Second weight
209 Second cord
210 Third weight
211 Fourth weight
212 Guiding passage
213 First weight-guiding means
213a Upper portion
213b Connecting portion
213c Lower portion
214 Second weight-guiding means
214a Upper portion
214b Connecting portion
214c Lower portion
231 Outer peripheral surface
241 Outer peripheral surface
251 Outer peripheral surface
301 Prime mover
302 Output shaft
303 First disk
304 Second disk
305A Third disk
305B Fourth disk
306 First cord
307 First weight
308 Second weight
309 Second cord
310 Third weight
311 Fourth weight
312 Guiding passage
331 Outer peripheral surface
341 Outer peripheral surface
351A Outer peripheral surface
351B Prime mover
351C Guiding passage

What is claimed is:

1. A prime mover which comprises:
at least three disks, i.e. a first disk, a second disk and a constant torque disk, each of which is concentrically fixed to an output shaft, the axis of which being mounted in perpendicular to the direction of gravity;
a first cord wrapped around the outer peripheral surface of either the first disk or the second disk;
a first weight and a second weight which are attached respectively to both ends of the first cord;
wherein
the radius of the first disk is made longer than the radius of the second disk;
the constant torque disk is designed to generate a constant torque;
the first cord is enabled to transition between a state where it is wrapped around the outer peripheral surface of the first disk and a state where it is wrapped around the outer peripheral surface of the second disk;
the first weight is hung down on one side of the output shaft so as to generate a torque in the output shaft in a direction opposite to the aforementioned constant torque;
the second weight is hung down on the opposite side of the output shaft so as to generate a torque in the output shaft in the same direction as that of the aforementioned constant torque;
the first weight is larger in mass than the second weight;
the constant torque is made smaller than the first torque to be generated in the first disk under a state where the first cord is wrapped around the outer peripheral surface of the first disk, as the constant torque is calculated based on a specific value to be obtained in such a way that a value to be obtained by subtracting the mass of the second weight from the mass of the first weight is multiplied by the gravitational acceleration and then the value thus obtained is further multiplied by the length of the radius of the first disk to obtain the specific value;
the second torque to be generated in the second disk is made smaller than the constant torque under a condition where the first cord is wrapped around the outer peripheral surface of the second disk as when the second torque is calculated based on a specific value to be obtained in such a way that a value to be obtained by subtracting the mass of the second weight from the mass of the first weight is multiplied by the gravitational acceleration and then the value thus obtained is further multiplied by the length of the radius of the second disk to obtain the specific value; and the first cord is enabled to transition at a prescribed interval between a state where it is wrapped around the outer peripheral surface of the first disk and a state where it is wrapped around the outer peripheral surface of the second disk, thereby making it possible to enable the output shaft to the rotate repeatedly in the forward direction and then in the reverse direction.

2. The prime mover according to claim 1, wherein a second cord having a third weight and a fourth weight attached respectively to the both ends the second cord is wound around the outer peripheral surface of the constant torque disk;

the third weight is made larger in mass than the fourth weight;

the fourth weight is hung down on one side of the output shaft as it is viewed from the direction of the axial line;

the third weight is hung down on the opposite side of the output shaft as it is viewed from the direction of the axial line.

3. The prime mover according to claim 2, which is provided with a position-adjusting means which is designed to return the third weight to the initial position before the rotation of the third weight in the forward direction after the rotation of output shaft in the forward direction and in the reverse direction, the position-adjusting means being also designed to descend or ascend the fourth weight so as take the initial position of the fourth weight before the rotation thereof in the forward direction.

4. The prime mover according to claim 3, wherein the first disk and the second disk are disposed neighboring to face each other along the axial direction thereof; the prime mover is further provided with a guide passage connecting the outer peripheral surface of the first disk and the outer peripheral surface of the second disk; and the first cord designed to be guided by way of the guide passage to a state where the first cord is wound around the outer peripheral surface of the first disk from a state where the first cord is wound around the outer peripheral surface of the second disk in a process of ascending the first weight; and the first cord designed to be guided by way of the guide passage to a state where the first cord is wound around the outer peripheral surface of the second disk from a state where the first cord is wound around the outer peripheral surface of the first disk in a process of ascending the second weight.

5. The prime mover according to claim 4, wherein the first weight is guided to a position wherein one end of the first cord hangs down from the first disk from a position where one end of the first cord hangs down from the second disk in the process of ascending the first weight; and the second weight is guided to a position wherein one end of the first cord hangs down from the second disk from a position where one end of the first cord hangs down from the first disk in the process of ascending the second weight.

6. The prime mover according to claim 3, wherein the first disk and the second disk are disposed neighboring to face each other along the axial direction thereof; the prime mover is further provided with an inclined surface constituting a side surface configuration of truncated cone thereby connecting the outer peripheral surface of the first disk and the outer peripheral surface of the second disk;

the first cord is designed to be guided along the inclined surface in a process of ascending the first weight so as to create a state wherein the first cord is wound around the outer peripheral surface of the first disk from a state where the first cord is wound around the outer peripheral surface of the second disk; and the first cord is designed to be guided along the inclined surface in a process of ascending the second weight so as to create a state wherein the first cord is wound around the outer peripheral surface of the second disk from a state where the first cord is wound around the outer peripheral surface of the first disk.

7. The prime mover according to claim 3, wherein the first weight is guided to a position wherein one end of the first cord hangs down from the first disk from a position where one end of the first cord hangs down from the second disk in the process of ascending the first weight; and the second weight is guided to a position wherein one end of the first cord hangs down from the second disk from a position where one end of the first cord hangs down from the first disk in the process of ascending the second weight.

8. The prime mover according to claim 2, wherein the first disk and the second disk are disposed neighboring to face each other along the axial direction thereof; the prime mover is further provided with a guide passage connecting the outer peripheral surface of the first disk and the outer peripheral surface of the second disk; and the first cord designed to be guided by way of the guide passage to a state where the first cord is wound around the outer peripheral surface of the first disk from a state where the first cord is wound around the outer peripheral surface of the second disk in a process of ascending the first weight; and the first cord designed to be guided by way of the guide passage to a state where the first cord is wound around the outer peripheral surface of the second disk from a state where the first cord is wound around the outer peripheral surface of the first disk in a process of ascending the second weight.

9. The prime mover according to claim 8, wherein the first weight is guided to a position wherein one end of the first cord hangs down from the first disk from a position where one end of the first cord hangs down from the second disk in the process of ascending the first weight; and the second weight is guided to a position wherein one end of the first cord hangs down from the second disk from a position where one end of the first cord hangs down from the first disk in the process of ascending the second weight.

10. The prime mover according to claim 2, wherein the first disk and the second disk are disposed neighboring to face each other along the axial direction thereof; the prime mover is further provided with an inclined surface constituting a side surface configuration of truncated cone thereby connecting the outer peripheral surface of the first disk and the outer peripheral surface of the second disk;

the first cord is designed to be guided along the inclined surface in a process of ascending the first weight so as to create a state wherein the first cord is wound around the outer peripheral surface of the first disk from a state where the first cord is wound around the outer peripheral surface of the second disk; and the first cord is designed to be guided along the inclined surface in a process of ascending the second weight so as to create a state wherein the first cord is wound around the outer peripheral surface of the second disk from a state where the first cord is wound around the outer peripheral surface of the first disk.

11. The prime mover according to claim 10, wherein the first weight is guided to a position wherein one end of the first cord hangs down from the first disk from a position where one end of the first cord hangs down from the second disk in the process of ascending the first weight; and the second weight is guided to a position wherein one end of the first cord hangs down from the second disk from a position where one end of the first cord hangs down from the first disk in the process of ascending the second weight.

12. The prime mover according to claim 2, wherein the first weight is guided to a position wherein one end of the first cord hangs down from the first disk from a position where one end of the first cord hangs down from the second disk in the process of ascending the first weight; and the second weight is guided to a position wherein one end of the first cord hangs down from the second disk from a position where one end of the first cord hangs down from the first disk in the process of ascending the second weight.

13. The prime mover according to claim 1, wherein the first disk and the second disk are disposed neighboring to face each other along the axial direction thereof; the prime mover is further provided with a guide passage connecting the outer peripheral surface of the first disk and the outer peripheral surface of the second disk; and the first cord designed to be guided by way of the guide passage to a state where the first cord is wound around the outer peripheral surface of the first disk from a state where the first cord is wound around the outer peripheral surface of the second disk in a process of ascending the first weight; and the first cord designed to be guided by way of the guide passage to a state where the first cord is wound around the outer peripheral surface of the second disk from a state where the first cord is wound around the outer peripheral surface of the first disk in a process of ascending the second weight.

14. The prime mover according to claim 13, wherein the first weight is guided to a position wherein one end of the first cord hangs down from the first disk from a position where one end of the first cord hangs down from the second disk in the process of ascending the first weight; and the second weight is guided to a position wherein one end of the first cord hangs down from the second disk from a position where one end of the first cord hangs down from the first disk in the process of ascending the second weight.

15. The prime mover according to claim 1, wherein the first disk and the second disk are disposed neighboring to face each other along the axial direction thereof; the prime mover is further provided with an inclined surface constituting a side surface configuration of truncated cone thereby connecting the outer peripheral surface of the first disk and the outer peripheral surface of the second disk;

the first cord is designed to be guided along the inclined surface in a process of ascending the first weight so as to create a state wherein the first cord is wound around the outer peripheral surface of the first disk from a state where the first cord is wound around the outer peripheral surface of the second disk; and the first cord is designed to be guided along the inclined surface in a process of ascending the second weight so as to create a state wherein the first cord is wound around the outer peripheral surface of the second disk from a state where the first cord is wound around the outer peripheral surface of the first disk.

16. The prime mover according to claim 15, wherein the first weight is guided to a position wherein one end of the first cord hangs down from the first disk from a position where one end of the first cord hangs down from the second disk in the process of ascending the first weight; and the second weight is guided to a position wherein one end of the first cord hangs down from the second disk from a position where one end of the first cord hangs down from the first disk in the process of ascending the second weight.

17. The prime mover according to claim 1, wherein the first weight is guided to a position wherein one end of the first cord hangs down from the first disk from a position where one end of the first cord hangs down from the second disk in the process of ascending the first weight; and the second weight is guided to a position wherein one end of the first cord hangs down from the second disk from a position where one end of the first cord hangs down from the first disk in the process of ascending the second weight.

18. A prime mover which comprises at least two disks, i.e. a variable radius disk and a constant torque disk, all of which are fixed concentrically to the output shaft, the axis of which being disposed perpendicular to the direction of gravity;

a cord wrapped around the outer peripheral surface of the variable radius disk; and a first weight and a second weight which are attached respectively to the end portions of the cord; wherein the radius of the variable radius disk is made variable;

the constant torque disk is designed to generate a constant torque;

the first weight is hung down on one side of the output shaft so as to generate a torque in the output shaft in a direction opposite to the aforementioned constant torque;

the second weight is hung down on the opposite side of the output shaft so as to generate a torque in the output shaft in the same direction as that of the aforementioned constant torque;

the first weight is larger in mass than the second weight;

the constant torque is made smaller than a first torque to be generated in the variable radius disk as it is calculated based on a specific value to be obtained through not only the multiplication of a value to be obtained through subtraction of the mass of the second weight from the mass of the first weight by the gravitational acceleration but also a further multiplication thereof by the longer radius of the variable radius disk under a condition where the radius of the variable radius disks is long, thereby obtaining the specific value;

a second torque to be generated in the variable radius disk is made smaller than the constant torque as it is calculated based on a specific value to be obtained through not only the multiplication of a value to be obtained through subtraction of the mass of the second weight from the mass of the first weight by the gravitational acceleration but also a further multiplication thereof by the shorter radius of the variable radius disk under the condition where the radius of the variable radius disk is short, thereby obtaining the specific value; and the output shaft is enabled to repeat the rotation of forward direction and the rotation of reverse direction due to the transition at a prescribed interval between a state where the radius of the variable radius disk is long and a state where the radius of the variable radius disk is short.

19. A prime mover which comprises at least four disks, i.e. a first disk, a second disk, third disk and a fourth disk, each of which is concentrically fixed to an output shaft, the axis of which being mounted in perpendicular to the direction of gravity;
   a first cord wrapped around the outer peripheral surface of either the first disk or the second disk;
   a first weight and a second weight which are attached respectively to the both ends of the first cord;
   a second cord wrapped around the outer peripheral surface of either the third disk or the fourth disk;
   a third weight and a fourth weight which are attached respectively to the both ends of the second cord; wherein
   the radius of the first disk is made longer than the radius of the second disk;
   the first cord is enabled to transition between a state where it is wrapped around the outer peripheral surface of the first disk and a state where it is wrapped around the outer peripheral surface of the second disk;
   the first weight is hung down on one side of the output shaft;
   the second weight is hung down on the opposite side of the output shaft;
   the first weight is larger in mass than the second weight;
   the radius of the third disk is made longer than the radius of the fourth disk;
   the second cord is enabled to transition between a state where it is wrapped around the outer peripheral surface of the third disk and state where it is wrapped around the outer peripheral surface of the fourth disk;
   the third weight is hung down on the opposite side of the output shaft;
   the fourth weight is hung down on one side of the output shaft;
   the third weight is larger in mass than the fourth weight;
   a first torque to be generated in the first disk as it is calculated based on a specific value to be obtained through not only the multiplication of a value to be obtained through subtraction of the mass of the second weight from the mass of the first weight by the gravitational acceleration but also a further multiplication thereof by the length of the radius of the first disk under a condition where the first cord is wrapped around the outer peripheral surface of the first disk and the second cord is wrapped around the outer peripheral surface of the third disk is made smaller than a third torque to be generated in the third disk as it is calculated based on the value to be obtained through not only the multiplication of a specific value to be obtained through subtraction of the mass of the fourth weight from the mass of the third weight by the gravitational acceleration but also a further multiplication thereof by the length of the radius of the third disk;
   a second torque to be generated in the second disk as it is calculated based on a specific value to be obtained through not only the multiplication of a value to be obtained through subtraction of the mass of the second weight from the mass of the first weight by the gravitational acceleration but also a further multiplication thereof by the length of the radius of the second disk under a condition where the first cord is wrapped around the outer peripheral surface of the second disk and the second cord is wrapped around the outer peripheral surface of the fourth disk is made larger than a fourth torque to be generated in the fourth disk as it is calculated based on a specific value to be obtained through not only the multiplication of a value to be obtained through subtraction of the mass of the fourth weight from the mass of the third weight by the gravitational acceleration but also a further multiplication thereof by the length of the radius of the fourth disk, thereby obtaining the specific value; and
   a state where the first cord is wrapped around the outer peripheral surface of the first disk and the second cord is wrapped around the outer peripheral surface of the third disk and a state where the first cord is wrapped around the outer peripheral surface of the second disk and the second cord is wrapped around the outer peripheral surface of the fourth disk are repeatedly transitioned at a prescribed interval, thereby making it possible to enable the output shaft to the rotate repeatedly in the forward direction and then in the reverse direction.

20. The prime mover according to claim 19 wherein the radius of the third disk is made shorter than the radius of the second disk, and a value to be obtained by subtracting the length of radius of the second disk from the length of radius of the first disk is enabled to become the same as the value to be obtained by subtracting the length of radius of the fourth disk from the length of radius of the third disk.

* * * * *